United States Patent
Watanabe

(10) Patent No.: US 8,368,929 B2
(45) Date of Patent: Feb. 5, 2013

(54) INFORMATION PROCESSING APPARATUS, METHOD, AND PROGRAM

(75) Inventor: Hideyuki Watanabe, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 12/428,192

(22) Filed: Apr. 22, 2009

(65) Prior Publication Data

US 2010/0007914 A1    Jan. 14, 2010

(30) Foreign Application Priority Data

Jul. 14, 2008  (JP) ................... 2008-182464

(51) Int. Cl.
- G06K 3/12 (2006.01)
- G06F 3/12 (2006.01)
- H04N 1/04 (2006.01)
- G06K 15/00 (2006.01)

(52) U.S. Cl. ...... 358/1.15; 358/1.13; 358/474; 358/1.14

(58) Field of Classification Search ................. 358/1.13, 358/1.15; 370/352, 455; 709/201
See application file for complete search history.

(56) References Cited

U.S. PATENT DOCUMENTS

| | | | |
|---|---|---|---|
| 6,801,329 B1 | 10/2004 | Urabe et al. | |
| 2002/0001302 A1* | 1/2002 | Pickett | 370/352 |
| 2003/0137989 A1* | 7/2003 | Nagai | 370/455 |
| 2005/0052678 A1* | 3/2005 | Urabe et al. | 358/1.13 |
| 2005/0128515 A1* | 6/2005 | Ohno | 358/1.15 |
| 2008/0195688 A1* | 8/2008 | Watanabe | 709/201 |

FOREIGN PATENT DOCUMENTS

| | | |
|---|---|---|
| JP | 2000-261515 | 9/2000 |
| JP | 2003-303080 | 10/2003 |
| JP | 2005-267100 | 9/2005 |
| JP | 2006-270898 | 10/2006 |
| JP | 2008-305209 | 12/2008 |

\* cited by examiner

*Primary Examiner* — Akwasi M Sarpong
(74) *Attorney, Agent, or Firm* — Oblon, Spivak, McClelland, Maier & Neustadt, L.L.P.

(57) ABSTRACT

An information processing apparatus linked to a network includes a central processing unit CPU, a power management unit, a physical layer, a packet engine unit, a packet filter, and a transmission control unit. The packet engine unit transmits a packet to the network. The packet filter receives a packet from the network. The transmission control unit controls packet transmission. The power management unit supplies power to the physical layer, packet filter, and packet engine unit but not the CPU during a low-power mode. The packet engine unit includes an identification data generator, a message data generator, and a packet frame generator. The identification data generator generates identification data. The message data generator generates message data. The packet frame generator generates a packet by combining the identification data and message data. The transmission control unit transmits the packet periodically during the low-power mode.

16 Claims, 29 Drawing Sheets

FIG. 4

DHCP protocol

| OP (1) | htype (1) | hlen (1) | hops (1) |
|---|---|---|---|
| xid (4) ||||
| secs (2) || flags (2) ||
| ciaddr (4) ||||
| yiaddr (4) ||||
| siaddr (4) ||||
| giaddr (4) ||||
| chaddr (16) ||||
| sname (64) ||||
| file (128) ||||
| options (312) ||||

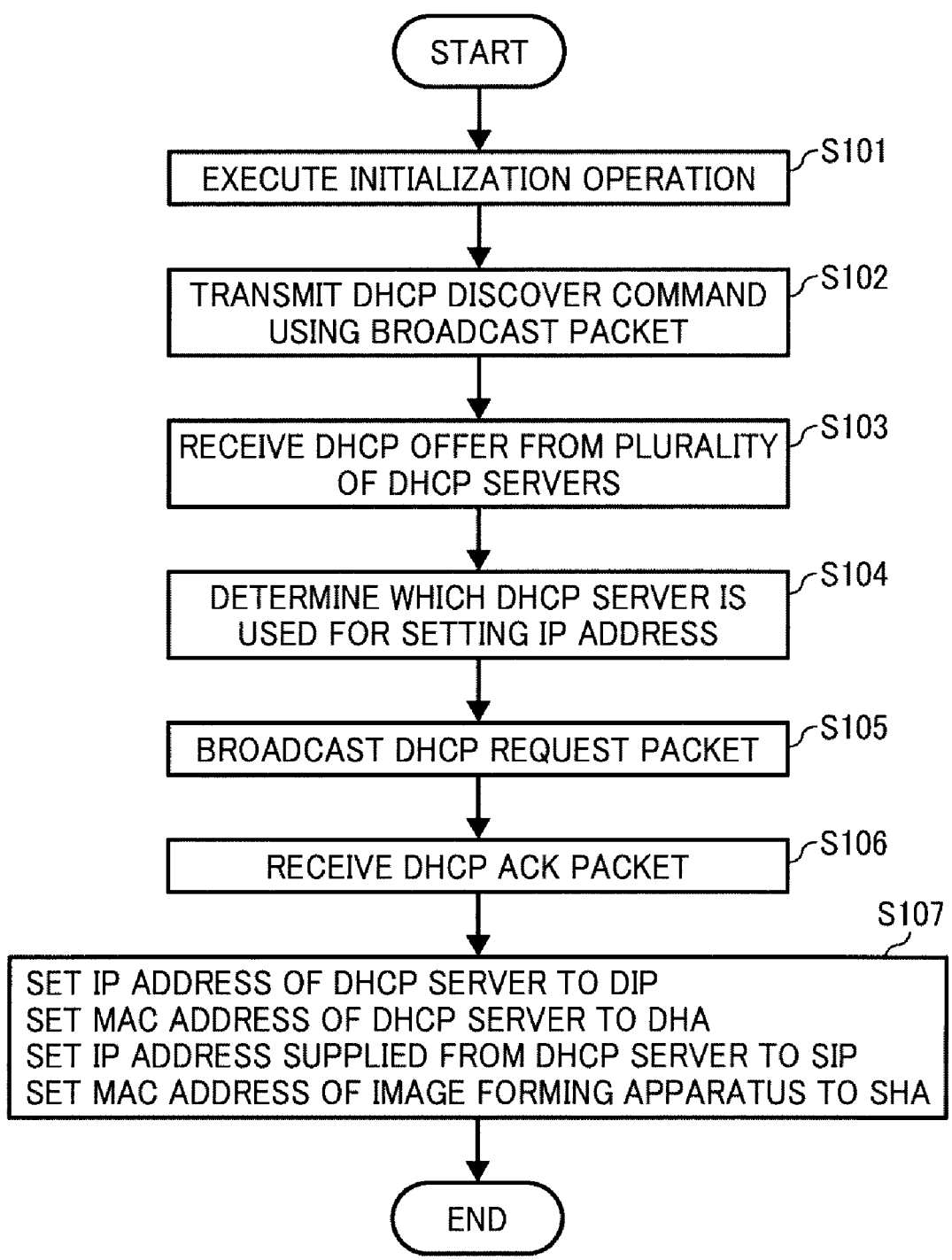

FIG. 6

DHCP Request (WHEN EXTENSION IS REQUESTED)

```
OP=Boot Request (1)
htype=Ethernet (1)
hlen=6
hops=0
xid=Transaction ID
secs=ELAPSED TIME
flags=0 (Unicast)
ciaddr=Client IP address
yiaddr=0
siaddr=0
giaddr=0
chaddr=Client MAC Address
sname=0
file=0
options
Magic Code=0x63825363
option 53:DHCP Message Type=DHCP Request
option 61:Client identifier
        Hardware type=ethernet
        Client MAC address:MAC Address
End Option (FF)
padding (0)
```

FIG. 8A

| PREAMBLE (8 BYTE) | DESTINATION MAC ADDRESS (6 BYTE) | SOURCE MAC ADDRESS (6 BYTE) | TYPE (2 BYTE) | DATA (46 – 1500 BYTE) | FCS (4 BYTE) |

FIG. 8B

| FIELD | LENGTH (BIT) | INPUT VALUE | REMARKS |
|---|---|---|---|
| PREAMBLE | 64 | 1010···11 | INPUT 1 AND 0 ALTERNATIVELY AND 11 FOR LAST 2 BITS |
| SOURCE MAC ADDRESS | 48 | – | |
| DESTINATION MAC ADDRESS | 48 | – | |
| TYPE | 16 | – | |
| DATA | – | – | |
| FCS | 32 | – | |

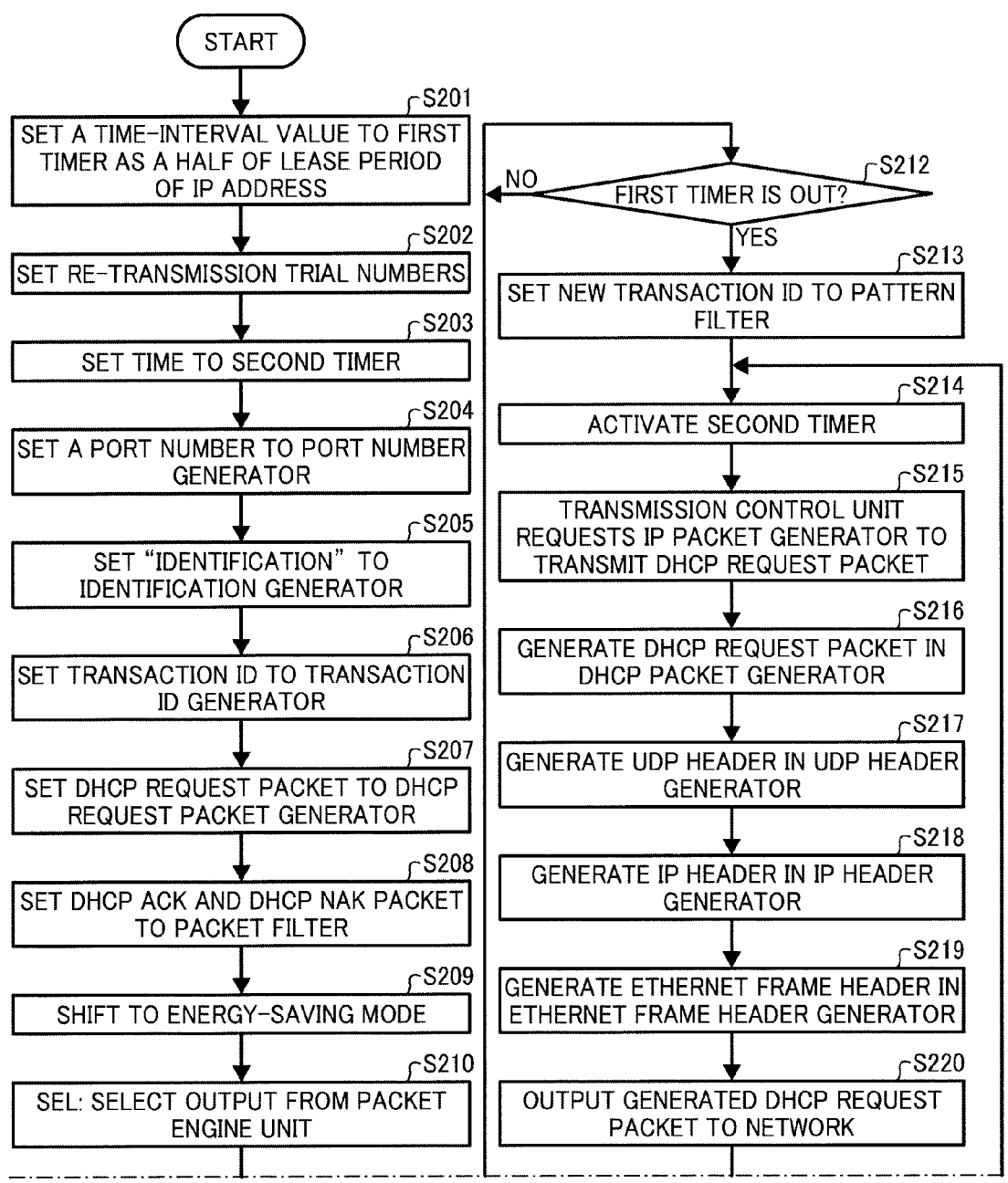

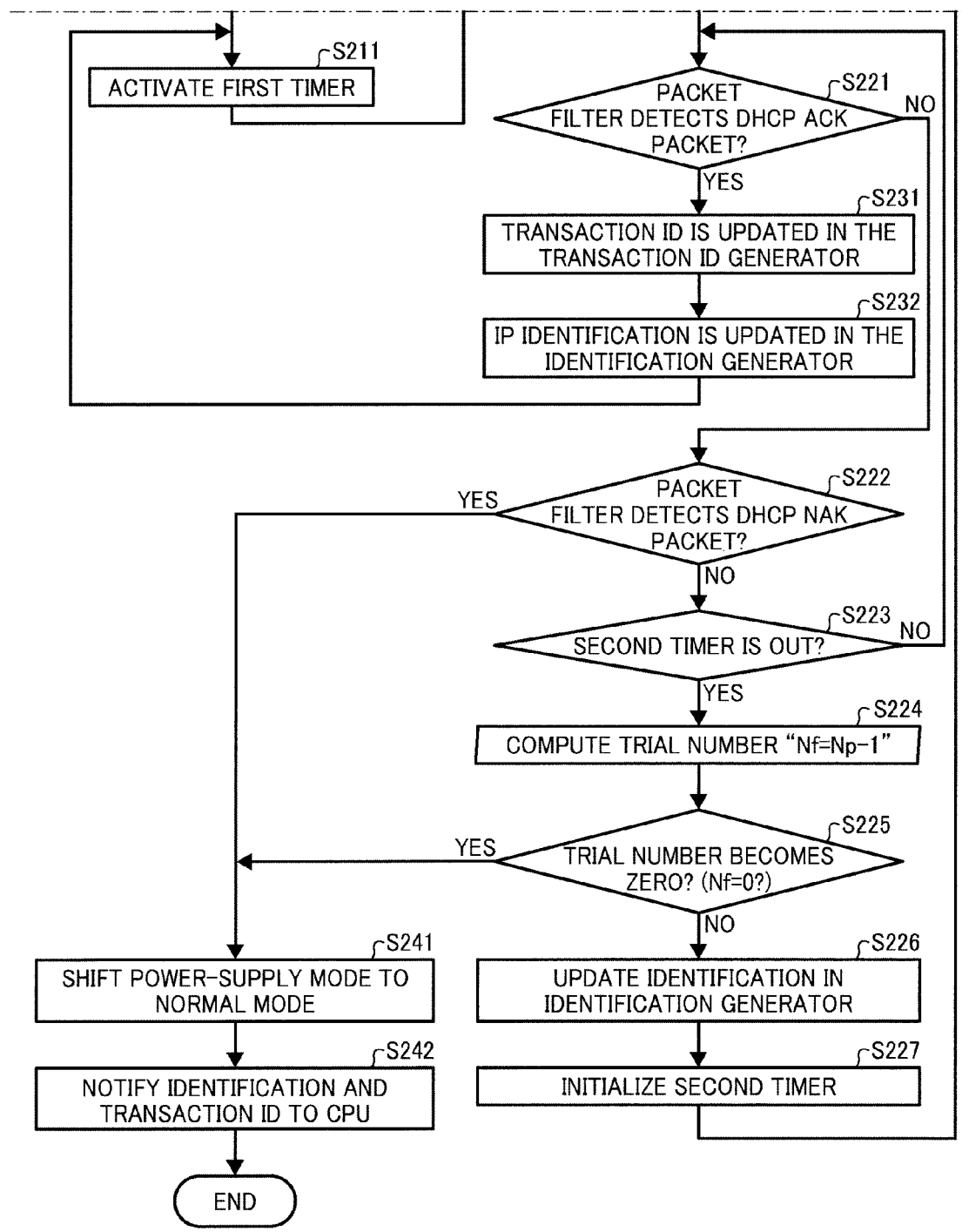

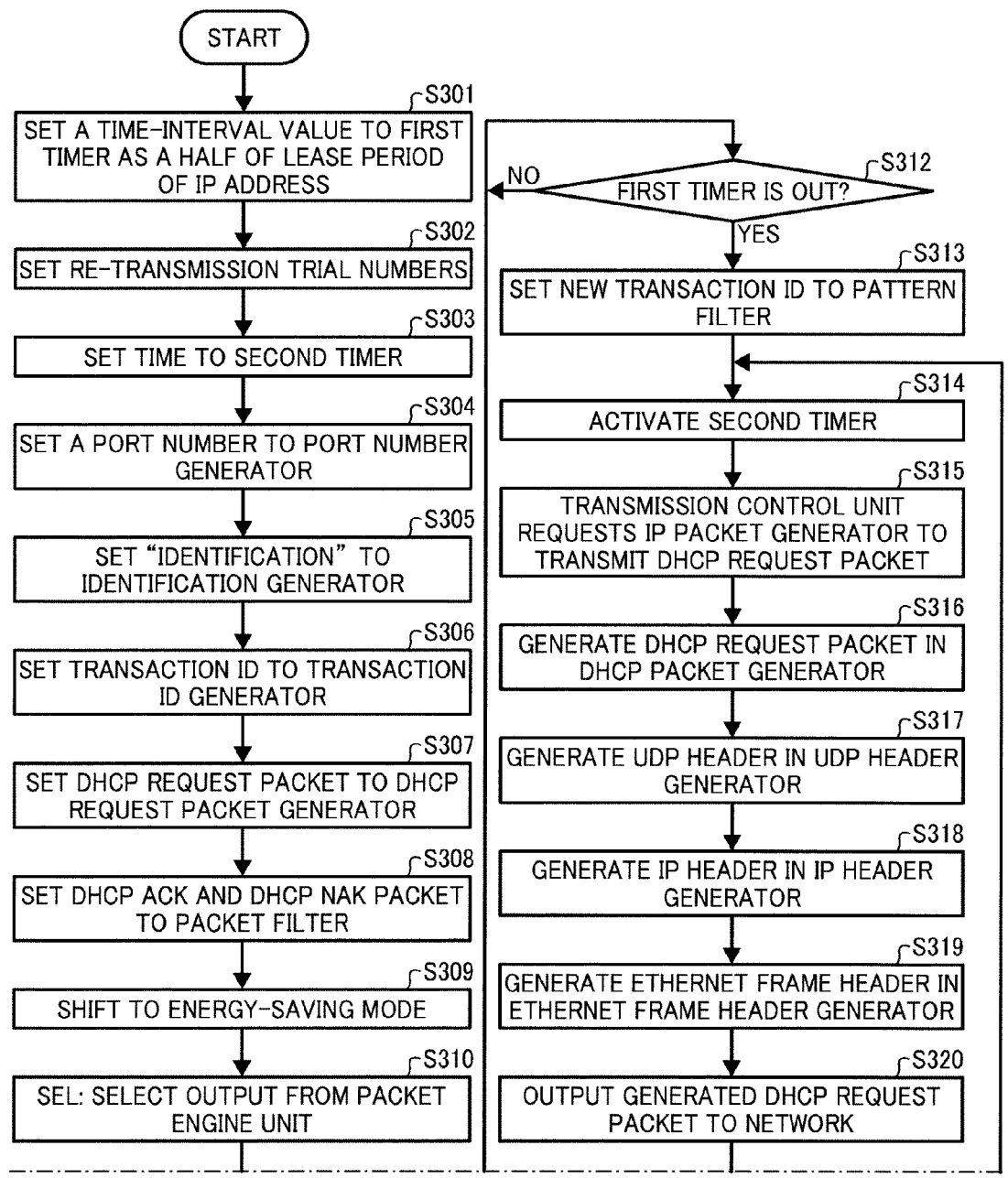

INFORMATION PROCESSING APPARATUS, METHOD, AND PROGRAM

CROSS-REFERENCE TO RELATED APPLICATIONS

This application claims priority under 35 U.S.C. 119(a) to Japanese Patent Application No. 2008-182464, filed on Jul. 14, 2008 in the Japan Patent Office, the entire contents of which are hereby incorporated by reference herein.

BACKGROUND OF THE INVENTION

1. Field of the Invention

The present invention generally relates to an information processing apparatus (e.g., a scanner, a printer, a multi-functional imaging apparatus) linked to a network that can exchange information (e.g., processing-required information, apparatus information) with the network, and a method of transmitting and processing information such as a packet on a periodic basis between the information processing apparatus and the network by transmitting a packet while maintaining a main control unit of the information processing apparatus in a low-power mode.

2. Description of the Background Art

With the spread of computer networks in office environments and elsewhere, information processing apparatuses (including, but not limited to, a scanner, a printer, a multi-functional imaging apparatus or the like) are typically linked to a network, such as a local area network (LAN), a wide area network (WAN), the Internet, and so forth, so that information processing apparatuses linked to the network can communicate with each other and exchange information via the network.

In such a network environment, one apparatus may transmit certain information or receive certain information from another apparatus via the network, in which the transmitted information may be used for a given purpose, for example indicating an apparatus status. In such network environment, information processing apparatuses may be devised that exchange information with other apparatuses via the network while themselves remaining in a low-power mode (also referred to as "lower-energy consumption mode," "energy-saving mode" or "sleep mode").

For example, JP-2006-270898-A discloses an image forming apparatus linked to a network, in which the image forming apparatus is designed to automatically transmit various packets to the network on a periodic basis under given transmission conditions while the image forming apparatus is set in a low-power mode, wherein such automatic transmission may be conducted by a specific device, for example.

Further, JP-2003-303080-A discloses an image forming apparatus linked to a network, in which the image forming apparatus may include a circuit configuration designed to respond to a status-request packet transmitted from the network using a hardware used as a network interface.

Further, JP-3773688-B discloses an image forming apparatus linked to a network, in which the image forming apparatus is designed to transmit data when the image forming apparatus receives a given packet.

The above-described configurations can be used to transmit apparatus information (e.g., apparatus status information) to the network when the apparatus is set to the energy-saving mode or low-power mode.

Although such configurations can enable apparatuses to transmit packets automatically to the network periodically while the apparatuses are set to the low-power mode, they may not be effective if certain types of information are to be communicated among apparatuses while maintaining the low-power mode for apparatuses. This is because the above-mentioned configurations are designed to exchange information in a relatively simple manner among apparatuses. For example, information may be transmitted from one apparatus to another apparatus in one-way direction (i.e., one-sided communication) automatically, or one apparatus may respond to a request from another apparatus in certain limited situations.

However, with advances in computer networks, apparatuses may need to communicate each other in a relatively sophisticated manner. For example, apparatuses may need to communicate each other in an interactive manner (i.e., interactive communication) for various situations while maintaining the energy-saving mode or low-power mode for the apparatus, and the above-described conventional configuration may not be effective for such interactive communication.

For example, dynamic host configuration protocol (DHCP) may be used to establish a connection between two information processing apparatuses linked to a network, in which one information processing apparatus may be referred to as a DHCP Client, such as an image forming apparatus (e.g., printer), and another information processing apparatus may be referred to as a DHCP Server, such as a server used for providing an internet protocol (IP) address to the DHCP Client. In such environment, the DHCP Client may transmit a first DHCP packet including one transaction ID to the DHCP Server, and then the DHCP Server may transmit a second DHCP packet to the DHCP Client in response to the first DHCP packet. If such communication can be conducted successfully between the DHCP Client and the DHCP Server, the DHCP Client may be assigned an IP address, and the DHCP Client may use such IP address to communicate with other apparatuses linked to the network.

However, for a variety of reasons, such IP address communication for the DHCP Client may not be maintained: For example, the DHCP Server may receive the first DHCP packet from the DHCP Client, and then processes the first DHCP packet in a proper manner and transmit the second DHCP packet to the network (first communication process). Yet, because of network error or the like, the DHCP Client may not receive the second DHCP packet, whereupon the DHCP Client determines that the communication was not established successfully. The DHCP Client may then re-transmit the first DHCP packet using the same transaction ID again to the DHCP Server so that a proper communication can be established. However, the DHCP Server determines that the DHCP Server has already properly responded during the first communication process and ignores a new request communication re-transmitted from the DHCP Client. As a result, the DHCP Client is unable to use the IP address set in previous communication and must transmit another DHCP packet using a new transaction ID that is different from the previous one.

When changing a transaction ID in a conventional configuration, an operation mode of the DHCP Client (e.g., image forming apparatus) may need to be shifted from a low-power mode to a normal mode to supply power to a main control unit of the image forming apparatus, in which the power-supplied main control unit may be used to change the transaction ID. The above-described packet communication may be successfully conducted using a new transaction ID. However, such method may not be desirable in terms of energy saving because power consumption of the image forming apparatus increases in the normal mode. Moreover, typically, a central processing unit (CPU) in a main control unit and a memory of an apparatus consume relatively greater amounts of power.

Consequently, the above-described conventional configuration may not be effective for interactive communication among apparatuses, which may mean that communication can be conducted in only a limited manner. Further, if sophisticated communication is to be conducted using the above-described conventional configuration, information processing apparatuses may consume a relatively greater amount of power, which is not desirable in terms of energy saving.

SUMMARY

In one aspect of the present invention, an information processing apparatus linked to a network includes a central processing unit (CPU), a power management unit, a physical layer, a packet engine unit, a packet filter, and a transmission control unit. The central processing unit is disposed in a main control unit. The power management unit controls a power-supply mode to the CPU. The power-supply mode including a low-power mode that stops power supply at least to the CPU. The physical layer communicates a packet to and from the network. The packet engine unit generates a packet having a given frame structure and to transmit the packet to the network via the physical layer. The packet filter receives a packet from the network via the physical layer, and detects a packet having a given frame structure that is receivable by the packet filter. The transmission control unit controls timing of transmitting the packet, generated by the packet engine unit, in which the packet is transmitted with a given timing. The power-supply mode includes at least a normal mode, and a low-power mode that stops power supply at least to the CPU. The power management unit supplies power to the physical layer, the packet filter, and the packet engine unit while the information processing apparatus is in the low-power mode.

The packet engine unit includes an identification data generator to generate identification data used for distinguishing each one of packets to-be-transmitted to the network, a message data generator to generate message data for each one of packets to be transmitted to the network, and a packet frame generator to generate a packet frame prepared by combining the identification data generated by the identification data generator and the message data generated by the message data generator.

During the low-power mode, the transmission control unit transmits the packet frame generated by the packet engine unit at a preset transmission time interval. In another aspect of the present invention, a method of processing information using an information processing apparatus linked to a network when the information processing apparatus is set to a low-power mode, in which a power supply to a central processing unit is stopped, is provided. In such environment, a first packet having a given frame structure is generated and transmitted from the information processing apparatus to the network, and a second packet having a given frame structure is transmitted from the network to the information processing apparatus. The method includes generating, preparing, and transmitting steps. The generating step generates identification data used for identifying each piece of message data to be transmitted to the network. The preparing step prepares the first packet by combining the identification data generated in the identification data generating step and the message data. The transmitting step transmits the first packet generated in the preparing step to the network at a preset transmission time interval in the low-power mode.

In another aspect of the present invention, a program stored on a computer-readable medium for processing information using an information processing apparatus linked to a network when the information processing apparatus is set to a low-power mode, in which a power-supply to central processing unit is stopped, is provided. In such environment, a first packet having a given frame structure is generated and transmitted from the information processing apparatus to the network, and then a second packet having a given frame structure is transmitted from the network to the information processing apparatus. The program includes instructions that when executed by a computer cause the computer to execute a method of processing information. The method includes generating, preparing, and transmitting steps. The generating step generates identification data used for identifying each piece of message data to be transmitted to the network. The preparing step prepares the first packet by combining the identification data generated in the identification data generating step and the message data. The transmitting step transmits the first packet generated in the preparing step to the network at a preset transmission time interval in the low-power mode.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 shows a configuration of UDP used for DHCP protocol;

FIG. 5 shows a flowchart for IP address setting at DHCP Client using DHCP protocol sequence;

FIG. 6 shows an example DHCP REQUEST used for DHCP protocol sequence of FIG. 4;

FIG. 7A shows one mode-shifting pattern that a power-supply mode shifts between a normal mode and an energy-saving mode, and FIG. 7B shows another mode-shifting pattern that a power-supply mode shifts between a normal mode, an energy-saving mode, and a modified energy-saving mode;

FIGS. 8A and 8B shows a frame configuration of Ethernet® frame;

FIG. 12(A) shows an example format of Ethernet packet, FIG. 12(B) shows an example format of IP packet in Ethernet frame, and FIG. 12(C) shows an example format of TCP packet;

FIG. 14(A) shows an example format of Ethernet packet, FIG. 14(B) shows an example format of IP packet of Ethernet frame, and FIG. 14(C) shows an example format of ICMP packet;

FIGS. 22A and 22B show one example flowchart for controlling process for a communication operation using DHCP protocol in an energy-saving mode;

FIGS. 23A and 23B show another example flowchart for controlling process for a communication operation using DHCP protocol in an energy-saving mode;

Figure 1:
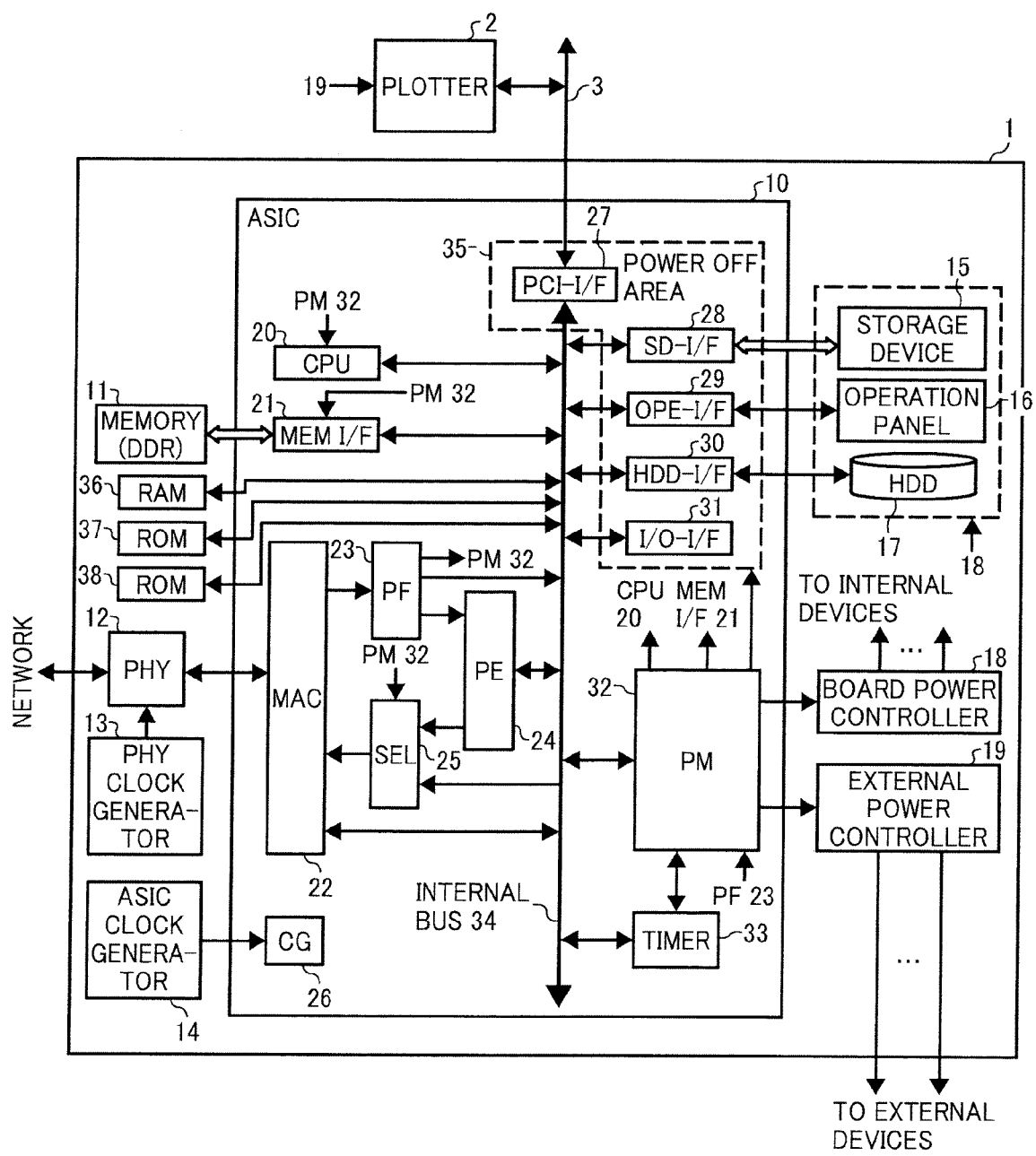
FIG. 1 shows a block diagram of a controller board of an image forming apparatus according to an exemplary embodiment.

The accompanying drawings are intended to depict example embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXAMPLE EMBODIMENTS

A description is now given of example embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise.

Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, an information processing apparatus according to an example embodiment is described hereinafter. The information processing apparatus may include an image forming apparatus using electrophotography, for example, and may be used as a copier, a printer, a facsimile, or a multi-functional apparatus, but not limited thereto.

FIG. 1 shows a block diagram of a controller board 1 for the image forming apparatus including a plotter 2, in which the controller board 1 may control operations of image forming apparatus, and the plotter 2 may produce image on a recording medium.

The controller board 1 may include an application specific integrated circuit (ASIC) 10, a memory 11, a physical layer 12 (PHY 12), a PHY clock generator 13, an ASIC clock generator 14, a storage device 15, an operation unit 16 (OPE 16), a hard disk drive 17 (HDD 17), a board power controller 18, an external power controller 19, a non-volatile memory 36, a first read-only-memory 37 (first ROM 37), and a second read-only-memory 38 (second ROM 38), for example.

The ASIC 10 may include a central processing unit 20, for example. The memory 11 may be a DDR-SDRAM (double data rate-synchronous dynamic random access memory), for example. The PHY 12 may be a physical layer used for communicating (e.g., receiving and transmitting) packet data (hereinafter, may be also referred to as "packet") with a given network. The storage device 15, used as a recording medium, may be Memory Card (registered trademark), but not limited thereto. For example, other medium such as Secure Digital Card (registered trademark) can be used. The non-volatile memory 36 may be a random access memory (RAM), for example. The first ROM 37 may store program and data, for example. The second ROM 38 may store media access control (MAC) address, for example. The MAC Address is a hardware-unique address.

The first ROM 37 may store two programs and data, for example. The two programs may include a first program, which is activated when a power is turned to ON, and a second program, which is activated after the first program is activated. When the power is turned to ON, the CPU 20 activates the first program stored in the first ROM 37, and loads the second program on the memory 11. After the first program is activated, the second program loaded on the memory 11 may be activated. The second program may be a program for conducting a processing for packet communication between the apparatus and the network under an energy-saving mode (or low-power mode). The CPU 20 reads one or more control programs, one or more process programs, and control data from the first ROM 37, and store such programs and data to the memory 11. With such a configuration, the CPU 20 can execute the programs at a given time when a given process is to be conducted. As such, the CPU 20 may control processing operations.

As for the controller board 1, the ASIC 10 may include the CPU 20, which may be used as a main control unit, a memory interface 21 (MEM-I/F 21), an media access control 22 (MAC 22), a packet filter 23 (PF 23), a packet engine unit 24 (PE 24), and a selector 25 (SEL 25), for example. The memory interface 21 is used as an interface for transmitting data to and fro the memory 11. The media access control 22 (MAC 22) communicates with the PHY 12. The packet filter 23 (PF 23) receives a packet, output from the MAC 22, and identifies types of packet. Specifically, the PF 23 selects which packet can be passed through to the packet engine unit 24. The packet engine unit 24 (PE 24) transmits a packet to the network in two ways: in one way, the PE 24 transmits a packet using a specific protocol automatically at a given time, which may be set as an given time interval; in another way, the PE 24 processes a packet, input from the PF 23, and transmits a packet using a specific protocol to the network in response to a packet received from the PF 23. The selector 25 (SEL 25) can receive data from the PE 24 or from an Internal BUS 34, and can transmit any one of the data to the MAC 22.

The ASCI 10 may further include a clock generator 26 (CG 26), a peripheral component interconnect interface 27 (PCI-I/F 27), a storage device interface 28 (SD-I/F 28), an operation unit interface 29 (OPE-I/F 29), a hard disk drive interface 30 (HDD-I/F 30), and an universal input/output interface 31 (I/O-I/F 31), for example. The CG 26 generates clock signals for the ASCI 10 using the ASIC clock generator 14. The PCI-I/F 27 transfers data to a PCI bus 3. The SD-I/F 28 controls data reading/writing for the storage device 15. The OPE-I/F 29 controls data input/output for the OPE 16. The HDD-I/F 30 controls data reading/writing for the HDD 17.

The CPU 20 activates the second program to initialize the image forming apparatus (e.g., printer), and then sets Internet Protocol address (IP address) for the image forming apparatus. In an exemplary embodiment, DHCP (dynamic host configuration protocol) protocol may be used to set IP address for a source apparatus and a destination apparatus, which is linked to the network. The source apparatus may transmit a packet to the network, and the destination apparatus may receive such packet. The source apparatus may be an image forming apparatus (e.g., printer), and the destination apparatus may be a server, but not limited to these.

Figure 2:
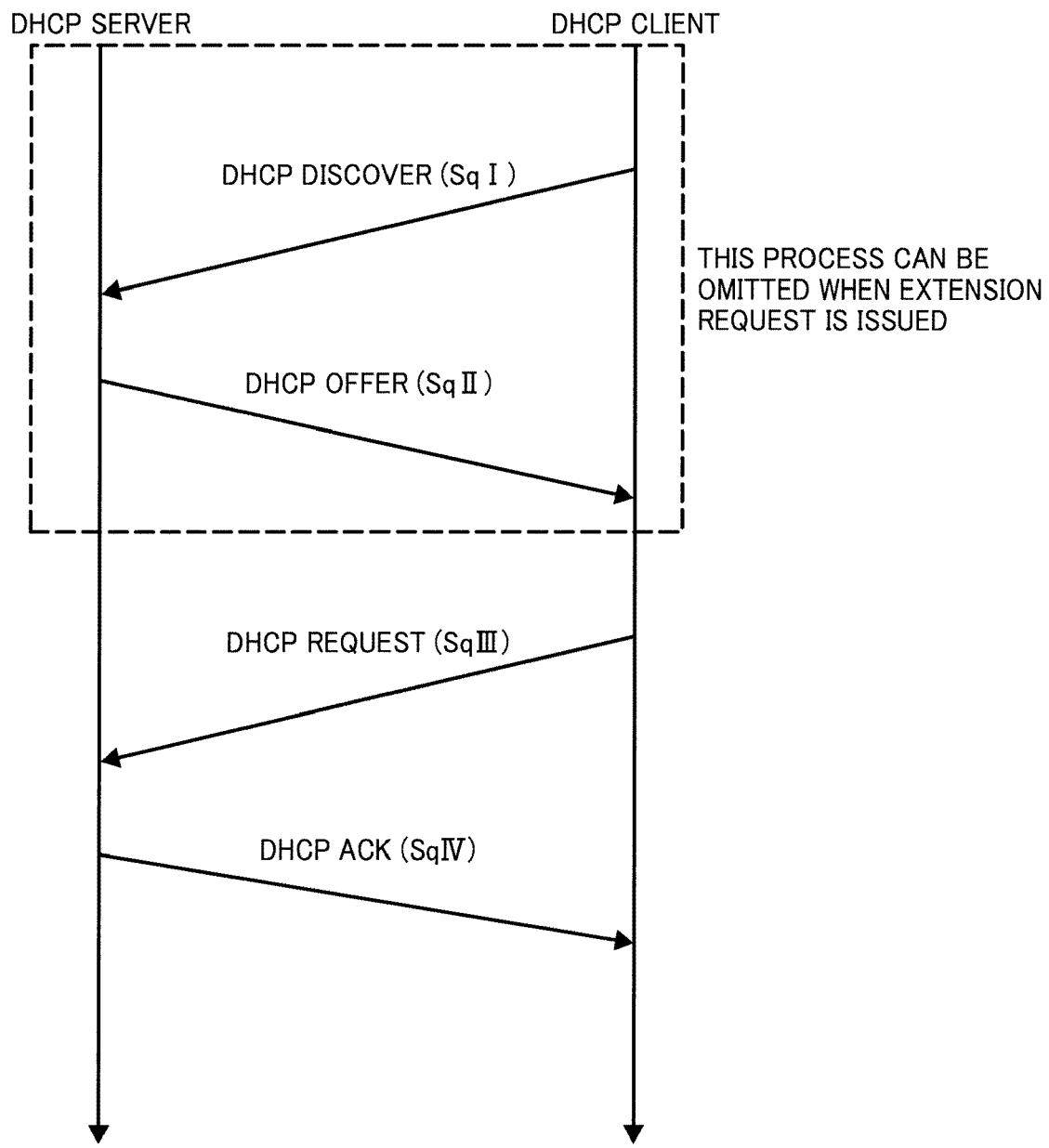
FIG. 2 shows an example sequence for packet communication using DHCP protocol.
Figure 3:
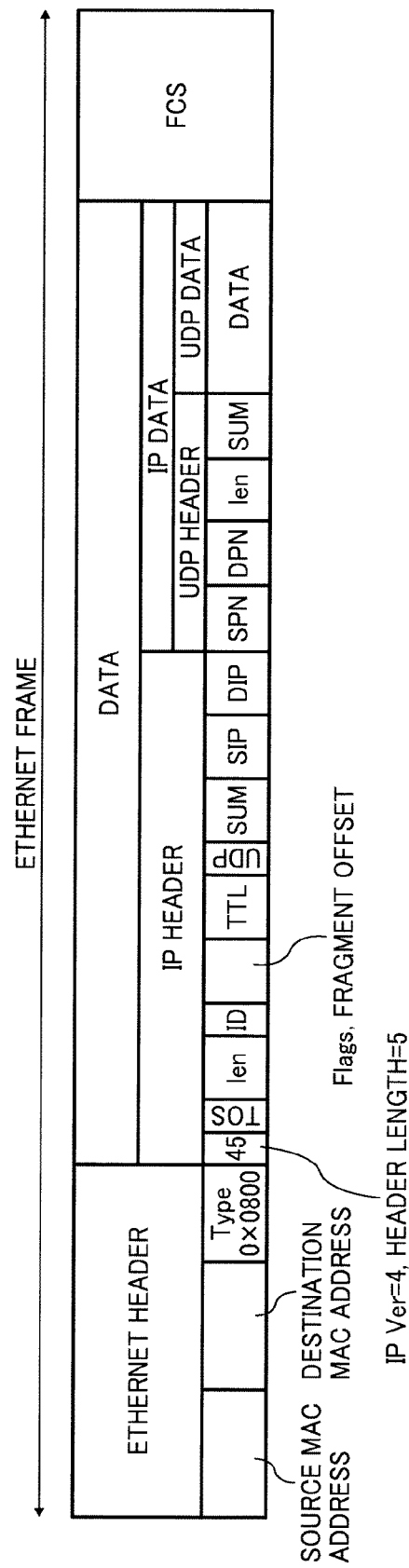
FIG. 3 shows a format of UDP packet used for DHCP protocol.

A description is now given to a process for setting IP address to an apparatus linked to a network with reference to FIGS. 2, 3, 4 and 5. FIG. 2 shows an example sequence for packet communication using DHCP protocol. FIG. 3 shows a format of "UDP packet" used for DHCP protocol (refer to a section of "UDP packet" to be described later). FIG. 4 shows a configuration of UDP data embedded in a UDP packet. The DHCP protocol is defined in a standard of RFC (request for comments) 1541. FIG. 5 shows a process flow for setting IP address or the like for a DHCP Client.

A description is now given to a process for setting an IP address for a DHCP Client linked to a DHCP Server via a network with reference to a sequence chart of FIG. 2 and a flowchart of FIG. 5. Further, as described below, a plurality of DHCP Servers may be linked to the network. Accordingly, in the process shown in FIG. 2, at least one of the DHCP Servers may be selected to set an IP address for the DHCP Client.

At step S101, the CPU 20 executes an initialization operation to set up the image forming apparatus (DHCP Client) at an activation status or operable condition.

At step S102, the DHCP Client transmits a DHCP Discover command to the DHCP Server using a broadcast packet (see sequence Sq I in FIG. 2).

At step S103, after the DHCP Server receives the DHCP Discover command from the DHCP Client, the DHCP Server offers a given IP address as a DHCP Offer to the DHCP Client in response to the DHCP Discover command (see sequence Sq II in FIG. 2). At step S103, the DHCP Client may be offered a plurality of IP addresses from the plurality of DHCP Servers. Accordingly, the DHCP Client may need to determine in advance which one of the DHCP Servers is used for setting the IP address. For example, if one given IP address is set for one DHCP Server, which is set as a designated Server, the DHCP Client can receive a DHCP Offer from such designated DHCP Server.

At step S104, it is determined which DHCP Server and which IP address are to be used for the DHCP Client by receiving the DHCP Offer from the DHCP Server, which is designated in advance.

At step S105, after the DHCP Client receives the DHCP Offer from the DHCP Server, the DHCP Client conducts a re-broadcasting operation. Specifically, the DHCP Client transmits (or broadcasts) a DHCP REQUEST to the designated DHCP Server to obtain a DHCP ACK (acknowledgment) response from the DHCP Server (see sequence Sq III in FIG. 2). The DHCP ACK may include information such as IP address to be set, but not limited thereto. A detail of the DHCP ACK will be described later.

At step S106, the DHCP Client receives the DHCP ACK from the DHCP Server, wherein the DHCP Server transmits the DHCP ACK in response to the DHCP REQUEST (see sequence Sq IV in FIG. 2). If the DHCP Client cannot receive the DHCP ACK after a given time elapses from the transmission time of the DHCP REQUEST, the DHCP Client may transmit the DHCP REQUEST again to the DHCP Server as a request of extension of communication. In such a case of request of extension of communication, a DHCP REQUEST shown in FIG. 6 may be issued. When the request of extension of communication is issued, a sequence from "DHCP Discover" to "DHCP Offer" shown in FIG. 2 can be omitted.

FIG. 4 shows a field configuration of UDP data embedded in the UDP packet used for DHCP protocol. The UDP data is disposed after a UDP header as shown in FIG. 3. The field configuration of FIG. 4 may include following data having following definition and data size, for example.

"OP" is an operation code having a data size of 1 byte, for example. The OP may be set to 1 for BOOT REQUEST, and 2 for BOOT REPLY, for example. "htype" is a hardware number having a data size of 1 byte, for example. The "htype" may be set to 1 for Ethernet (registered trademark), for example. "hlen" is a hardware address length having a data size of 1 byte, for example; The "hlen" may be set to 6 for Ethernet, for example. "hops" is the number of data transfer process, which may have a data size of 1 byte, for example, and the DHCP Client may not use the "hops." "xid" is a transaction ID (identification) data having a data size of 4 byte, for example. "secs" is an elapsed time having a data size of 2 bytes, for example. "flags" is a broadcast flag having a data size of 2 bytes, for example. The "flags" may be set to "0x8000" for broadcast, and "0" for unicast.

"ciaddr" is a client IP address having a data size of 4 bytes, for example. When a DHCP REQUEST is issued, an address assigned for the DHCP Client at a previous time is set. "yiaddr" is a requester IP address having a data size of 4 bytes, for example. "siaddr" is an IP address of Server to be used in a next initialization having a data size of 4 bytes, for example; the Server issues a response using DHCP Offer, DHCP ACK, and DHCP NAK. "giaddr" is an IP address of relay agent having a data size of 4 bytes, which may be used when a relay agent is used. "chaddr" is a Client hardware address having a data size of 16 bytes, for example. "snamer" is a host name of Server having a data size of 64 bytes, for example. The "snamer" may be a string of characters ended with a null character as an option. "file" is a boot file name having a data size of 128 bytes; the "file" may be a string of characters ended with a null character. "options" is an option having a data size of 312 bytes, for example. The "options" is defined in a standard of RFC 1533.

A description goes back to the flowchart of FIG. 5. After step S106, the process goes to step S107, in which the DHCP Client sets the IP address in the DHCP ACK as a parameter for the IP address, which is used with respect to the DHCP Server. Specifically, the CPU 20 reads a MAC Address stored in the second ROM 38 and then stores the MAC Address to a source hardware address (SHA) provided in a register 242 of the PE 24. The PE 24 will be described later with reference to FIG. 18. Further, a Client IP address in the DHCP ACK protocol received from the designated DHCP Server is set as an IP address for the DHCP Client (e.g., image forming apparatus), which corresponds to "ciddar" of DHCP protocol of FIG. 4. The CPU 20 stores the IP address to a source IP address (SIP) in the register 242 of the PE 24.

Further, an IP address of the DHCP Server, set in advance, may be set as a destination IP address (DIP).

A hardware address of DHCP Server can be determined from DHCP protocol. For example, a hardware address of DHCP Server can be determined from a source MAC Address of Ethernet header used for the DHCP ACK protocol. The source MAC Address of Ethernet header may be stored in a destination hardware address (DHA). Further, a hardware address of DHCP Server can be determined from DHCP Offer protocol as similar to DHCP ACK protocol.

As such, the CPU 20 can determine IP address and hardware address for the DHCP Server and the DHCP Client (e.g., image forming apparatus). Further, the DHCP ACK protocol includes a lease time for IP address. For example, a half value of the lease time may be stored in a first timer in a transmission-time setting unit 249 of the is PE 24, which will be described later in a section for the PE 24.

Control of Power-Supply Mode

Further, the ASIC 10 may include a power management unit 32 (PM 32), and a timer 33. The power management unit 32 may control a power supply to devices or units disposed in or out of the controller board 1. Specifically, the power management unit 32 may control a power source, which supplies power to devices or units disposed in or out of the controller board 1. The ASIC 10 may include circuit elements and portions that the PM 32 can control power-supply or power-stop from a power source. Such circuit elements and portions may be the CPU 20, the memory 11 and a power off area 35, for example. In contrast, power may be constantly supplied to another circuit elements in the controller board 1. The power off area 35 may include the PCI-I/F 27, the SD-I/F 28, the OPE-I/F 29, the HDD-I/F 30, and the I/O-I/F 31 as circuit elements, which my not be linked to a network operation directly.

The PM 32 may manage power consumption level of a power source by adjusting a power-supply mode when the image forming apparatus is in a power-supplied condition. The power-supply mode may include at least two modes, which may be corresponded to different conditions of apparatus. For example, the power-supply mode may include a normal mode and a low-power mode. In the normal mode, power may be supplied to in a manner that the apparatus as a whole is in a fully operable manner; in the low-power mode, some of power supply in the apparatus may be cut. Accordingly, the power supply in the apparatus may be changed depending on the power-supply mode, in which the power source is controlled under a given control condition corresponding to each one of the power-supply modes.

Figure 7A:
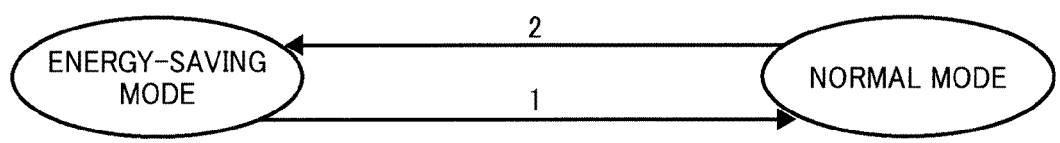
FIGS. 7A and 7B show an example mode-shifting pattern for power-supply modes managed by a power management unit shown in FIG. 1. In particular.

In an exemplary embodiment, the power-supply mode can be shifted between the normal mode and the low-power mode (or "energy-saving mode") as shown in FIG. 7A by controlling the board power controller 18 and the external power controller 19. In the low-power mode, the board power controller 18 and the external power controller 19 are controlled so that a power supply to the CPU 20, the memory 11 and the power off area 35 is stopped, and a power supply to the plotter 2, connected to the controller board 1 via the PCI bus 3, is also stopped.

When a power button of the image forming apparatus is pressed, the ASIC 10 may be supplied with electric power from a power source. Then, the PM 32 supplies power to devices or units using the normal mode. Specifically, the PM 32 supplies power, generated by the power source, to the CPU 20 and the memory 11, for example. Further, the PM 32 supplies power to the power off area 35 including PCI-I/F 27, SD-I/F 28, OPE-I/F 29, HDD-I/F 30, and I/O-I/F 31. Further, power may be supplied to devices disposed in or out of the controller board 1 using the board power controller 18 and the external power controller 19. Under such power-supplied condition, the ASIC 10 starts to control the image forming apparatus as a whole, at which a normal operation can be conducted.

Further, in the normal mode, the PM 32 activates the timer 33 to check whether a given time period elapses after starting the normal mode. For example, if the given time period elapses with a condition that the image forming apparatus does not receive a packet that is designated to the image forming apparatus (i.e., apparatus-designated packet) from the network and all applications running on the CPU 20 become into an idle condition, the power-supply mode may be shifted from the normal mode to the energy-saving mode (see a shift arrow 2 in FIG. 7A). The packet filter 23 may be used to detect whether a packet is received by the image forming apparatus. A condition that the image forming apparatus does not receive a packet that is designated to the image forming apparatus (i.e., apparatus-designated packet) can be recognized if an empty flag is set in a buffer (see a buffer 235 in FIG. 18) of the packet filter 23.

When the power-supply mode is shifted to the energy-saving mode (or low-power mode), the PM 32 may stop power-supply to the CPU 20, the memory 11, and the power off area 35 in the ASIC 10. Further, the board power controller 18 may stop power-supply to the storage device 15, the OPE 16, and the HDD 17 from the power source. Further, the external power controller 19 may stop power-supply to the plotter 2 or the like, disposed out of the controller board 1, from the power source. When the power-supply mode is shifted to the energy-saving mode as such, the PM 32 instructs the SEL 25 to use data that is output from the PE 24. When the image forming apparatus is in the normal mode, the SEL 25 receives an instruction and data via the internal bus 34, in which the CPU 20 may control such operation.

Further, when the power-supply mode is shifted to the energy-saving mode (or low-power mode), the PM 32 notifies such mode shift to the MEM-I/F 21 to control power consumption of the memory 11 via the MEM-I/F 21. Specifically, when the power-supply mode is shifted to the energy-saving mode, the PM 32 controls power consumption of the memory 11 via the MEM-I/F 21 so that the memory 11 shifts its status to "self-refresh mode," in which the memory 11 retains information which exists in the memory 11 before the power-supply mode shifts to the energy-saving mode.

Further, when the power-supply mode is to be shifted to the normal mode or a modified energy-saving mode (see FIG. 7B), the PM 32 shifts the memory 11 to the normal mode via the MEM-I/F 21, by which the memory 11 can be accessed via the internal bus 34. When the power-supply mode is shifted to the normal mode from the energy-saving mode, the memory 11 returns to a condition before the power-supply mode is shifted to the energy-saving mode, in which the memory 11 retains data before the power-supply mode is shifted to the energy-saving mode.

Even if the low-power mode is set, the PE 24 and the PHY 12 may be constantly supplied with power, by which packet(s) can be communicated between the image forming apparatus and the network.

In an exemplary embodiment, when the power-supply mode is shifted to the energy-saving mode, the PE 24 generates a given packet automatically at a given time, which may be set as an given time interval, and transmits the packet to the network via the PHY 12. Specifically, without using the CPU 20, which is cut from power-supply when the energy-saving mode is in set, the PE 24 can generate and transmits a DHCP REQUEST packet to a given destination apparatus linked to the network via the PHY 12. Further, when the DHCP REQUEST packet is transmitted to the network as such, the destination apparatus may receive the DHCP REQUEST packet, and transmits a response packet using DHCP protocol to the network. Then, such response packet may be received by the image forming apparatus having the PE 24 and the PF 23. Further, if the response packet received by the image forming apparatus during the low-power mode is not a packet designated to the image forming apparatus (i.e., non apparatus-designated packet), the packet filter 23 may destroy such packet. If the response packet is designated to the image forming apparatus, the PE 24 can generate a packet based on the response packet.

Figure 7B:
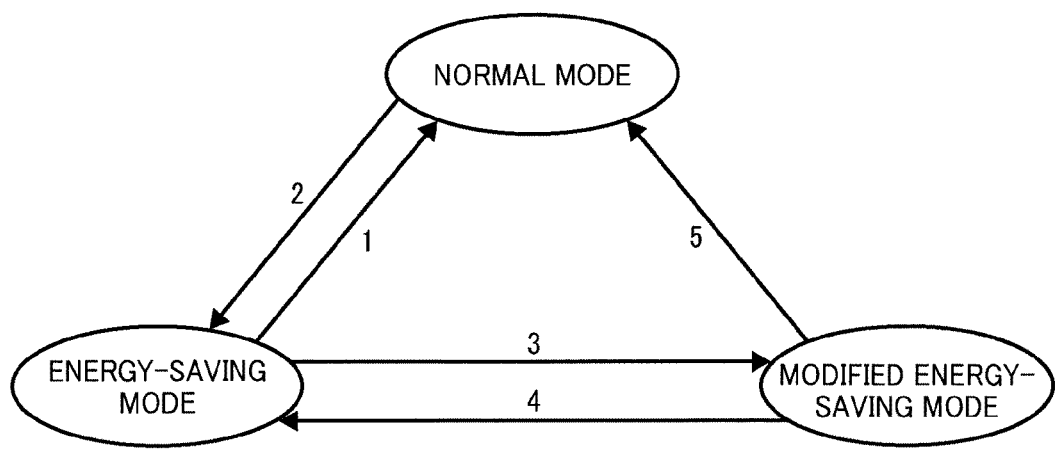

FIG. 7B shows an example mode-shifting pattern of the power-supply mode including a modified energy-saving mode as another low-power mode. During the energy-saving mode, the image forming apparatus can receive some packet from the network via the PHY 12 without activating the CPU 20, and then the image forming apparatus can transmit a response packet to the network. However, when the image forming apparatus receives certain type of packet from the network, the CPU 20 may need to be activated. Accordingly, the CPU 20, cut from power-supply, may be supplied with power again. In the modified energy-saving mode, the CPU 20 may be supplied with a relatively lower power if a packet does not include "print request" (hereinafter "no-print request") while the power off area 35 and the plotter 2 are still cut from power supply, by which another low-power mode, termed as modified energy-saving mode in FIG. 7B, can be realized. If a packet includes "print request," the energy-saving mode may be shifted to the normal mode (see a shifting arrow 1 in FIG. 7B). If a packet includes "no-print request," the energy-saving mode may be shifted to the modified energy-saving mode (see a shifting arrow 3 in FIG. 7B). Further, the modified energy-saving mode can be shifted to the energy-saving mode (see a shifting arrow 4 of FIG. 7B) or the normal mode (see a shifting arrow 5 in FIG. 7B) as similar to FIG. 7A.

Packet Communicable with Network

A description is now given to a frame structure of packet and data types of packet that can be used for communication between the image forming apparatus and the network. For example, the frame structure of packet may employ Ethernet (registered trademark) frame, but the frame structure of packet may not limited these.

Ethernet Frame

FIG. 8A shows an example frame structure of Ethernet, and FIG. 8B shows an example data type for each field in the Ethernet frame. As shown in FIG. 8A, the Ethernet frame may include information of preamble, a destination MAC Address, a source MAC Address, a type, data, and a FCS (frame check sequence), for example. As shown in FIG. 8B, the preamble indicates a start of one frame, and may have a data length of 64 bits (or 8 bytes). For example, the preamble may be composed of 64 bits of information inputting 31 bits of "1" and 31 bits of "0" alternatively and "11" for last 2 bits (i.e., "1010 . . . 11").

The destination MAC Address indicates an address of an apparatus (e.g., an image forming apparatus or the like connected with local area network (LAN)) that receives a packet. The destination MAC Address may have a data length of 48 bits (or 6 bytes).

The source MAC Address indicates an address of an apparatus that sends a packet. The source MAC Address may have a data length of 48 bits (or 6 bytes). The MAC (media access control) is specified in the IEEE (Institute of Electrical and Electronics Engineers) 802-1990.

The destination MAC Address may be unicast address, broadcast address, and multicast address; the unicast address is used to identify each one of telecommunication apparatuses linked to a network; the broadcast address is used for all telecommunication apparatuses as destination in a broadcast domain linked to the network, in which all bits are set to "1"; the multicast address is used for all telecommunication apparatuses in a given group of telecommunication apparatuses linked to the network. The type may be designated as IPv4 (Internet Protocol Version 4) protocol using "0x0800"; ARP (address resolution protocol) protocol using "0x0806"; IPv6 protocol using "0x86DD"; AppleTalk protocol using "0x809B"; IPX (NetWare) protocol using "0x8037"; NetBIOS/NetBEUI (NetBIOS extended user interface) protocol using "0x8191," for example. Each of the above mentioned protocols is a registered trademark. The data can be designated with a data length of from 46 to 1500 bytes, for example. The FCS (frame check sequence) is a checksum, which is generated by an equation of "CRC (cyclic redundancy check)-32".

IP Packet

Figure 9:
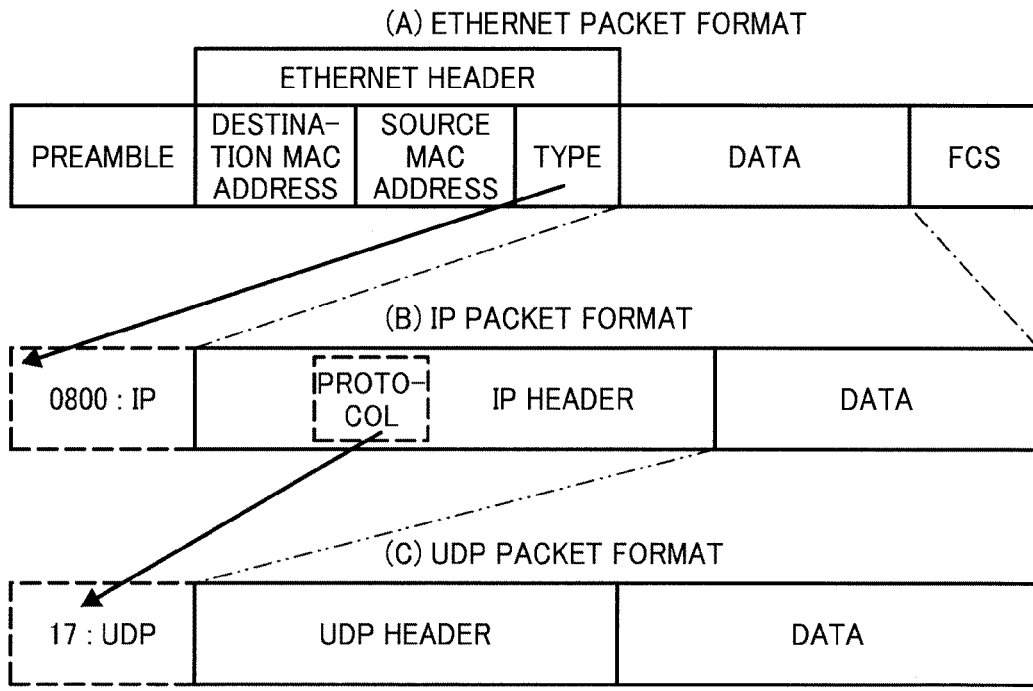
FIG. 9 shows a format of IP packet and UDP packet in Ethernet frame of FIG. 8.

FIG. 9(A) shows an example format of Ethernet packet, and FIG. 9(B) shows an example format of IP packet in Ethernet frame. FIG. 9(B) shows an example IP packet frame, in which "0x0800" is set in "type" of Ethernet header of Ethernet frame, which is indicated with a dotted line in FIG. 9(B). As for an IP packet, "IP header" and "data" are included in "data" of the Ethernet frame as shown in FIG. 9(B).

Figure 10:
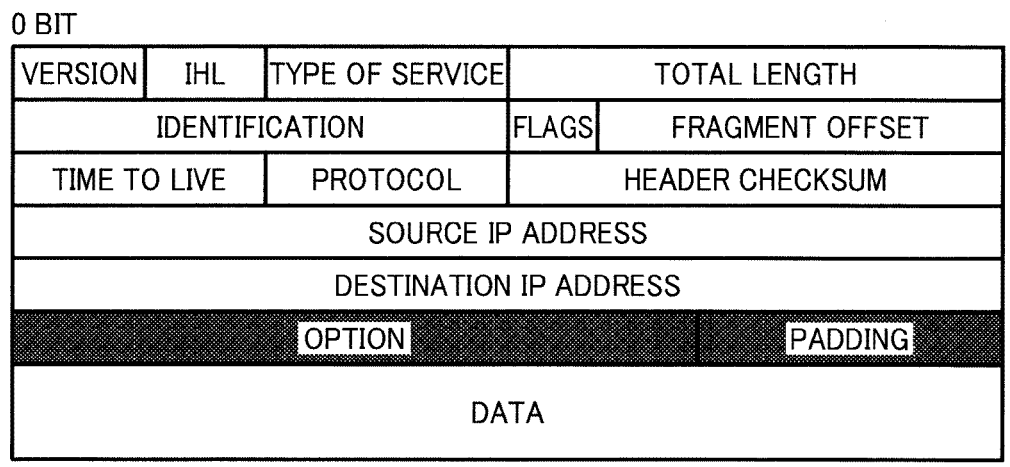
FIG. 10 shows data type for each field in IP packet.

FIG. 10 shows an example format of IP packet. As shown in FIG. 10, a header of IP packet may include a header portion (IP header) and data portion. The IP header may include a version field (Version), a header length (IHL) field, a Type Of Service field, a packet length field (Total Length), an identification field (Identification), a flag field (Flags), a Fragment Offset field, a Time To Live field, a protocol number field (Protocol), a Header Checksum field, a source IP address field (Source IP Address), a destination IP address field (Destination IP Address), for example. Further, the header of IP packet may include "Option" and "Padding." When "Option" is added, "Padding" is also added to set a data length of a field composed of "Option" and "Padding" as a multiple of 32 bits. However, "Option" may not be used in general.

The "version" field of IP header may have a data length of 4 bits, and may store "4" for IPv4 protocol, and "6" for IPv6 protocol, for example. The "header length" field may have a data length of 4 bits, and the data length may be 20 bytes for IPv4 protocol, for example. The "Time-To-Live" field may store a Time-To-Live value for packet on the network. The Time-To-Live value is reduced one by one every time the packet passes through a router. When Time-To-Live value becomes "0," the packet will be destroyed. A detail of such process is defined in a standard of RFC (Request For Comments) 2200. The "Type of Service" is defined in a standard of RFC 791, and a detail of the protocol number is defined in a standard of RFC 1700. The "identification" field may store "identification" having a given value, which is used when to restore a fragment. The "flag" field stores a control value, which is used when to divide a packet.

UDP Packet

Figure 11:
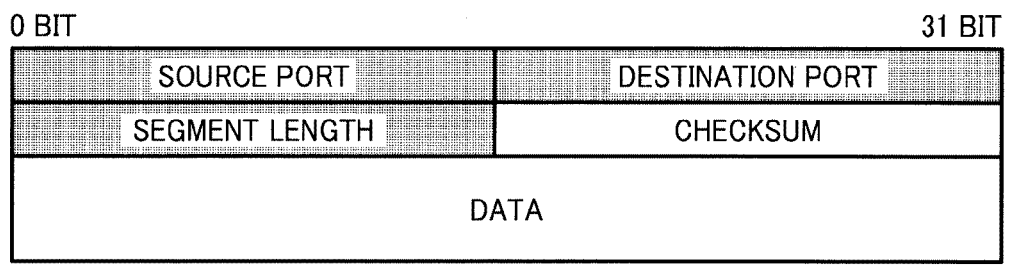
FIG. 11 shows data type for each field in UDP packet.

FIG. 9(B) shows an example format of IP packet of Ethernet frame, and FIG. 9(C) shows an example format of UDP (user datagram protocol) packet. Further, FIG. 11 shows data type for each field in the UDP packet. When configuring the IP packet, "data" of the Ethernet frame may include "IP header" and "data" as shown in FIG. 9(B). When configuring the UDP packet, the IP header stores data, which designates UDP protocol, and "data" of the IP packet may include "UDP header" and "data" as shown in FIG. 9(C). As shown in FIGS. 9(B) and 9(C), a protocol section of IP packet is set 17 to configure a UDP packet.

FIG. 11 shows data type for each field in UDP packet. The UDP packet may include a source port number field (16 bits), a destination port number field (16 bits), a segment length field (16 bits), a checksum field (16 bits) and data, for example. The source port number field and the destination port number field store port numbers, which may be used to identify types of application. Such port number may be a known port number defined in a standard of RFC 1700. A detail of UDP is defined in a standard of RFC 768.

TCP Packet

Figure 12:
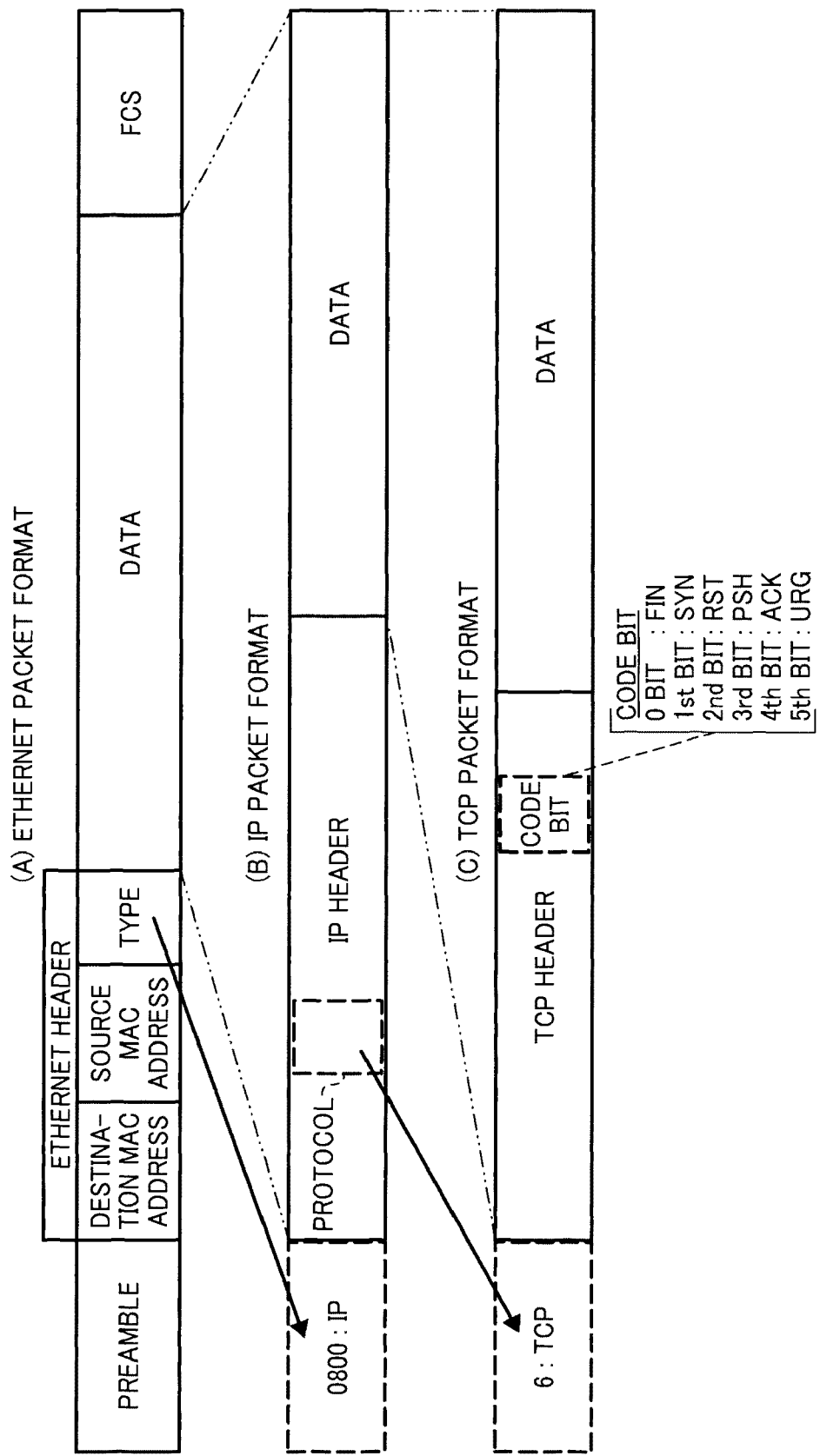
FIG. 12 shows a format of IP packet and TCP packet for Ethernet frame of FIG. 8A and data type for each field in IP packet.
Figure 13:
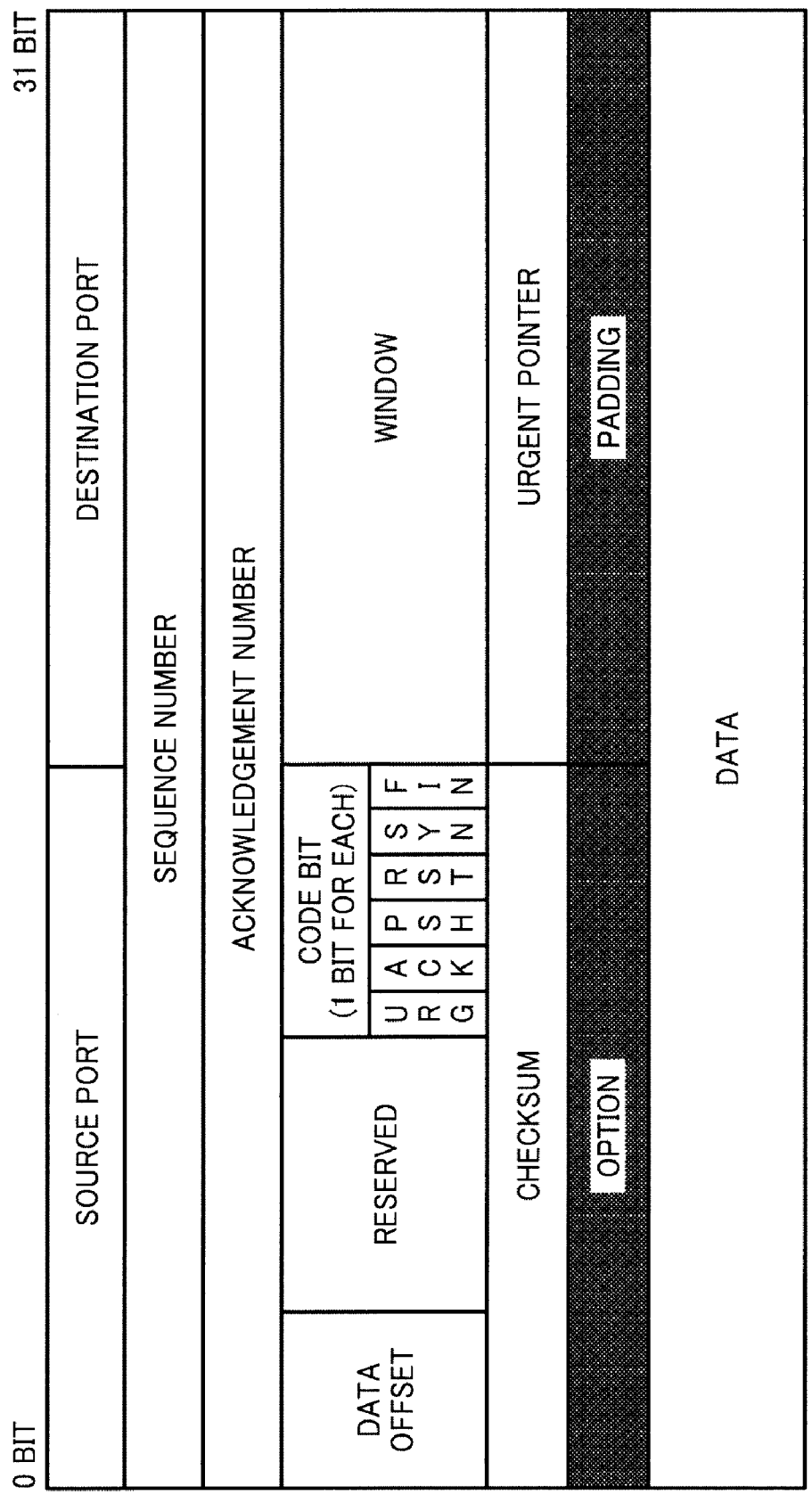
FIG. 13 shows data type for each field in TCP packet.

FIG. 12(A) shows an example format of Ethernet packet, FIG. 12(B) shows an example format of IP packet of Ethernet frame, and FIG. 12(C) shows an example format of TCP (transmission control protocol) packet. Further, FIG. 13 shows data type for each field in TCP packet. FIG. 12(B) shows an example TCP packet frame, in which "0x0800" is set in "type" of Ethernet header of Ethernet frame (see FIGS. 12(A) and 12(B)). As for an IP packet, "IP header" and "data" are included in "data" of the Ethernet frame as shown in FIGS. 12(A) and 12(B). As for a TCP packet, "TCP header" and "data" are included in "data" of the IP packet as shown in FIGS. 12(B) and 12(C). As shown in FIG. 12(C), the TCP header includes a plurality of code bits, which may store "FIN" for 0 bit, "SYN" for 1st bit, "RST" for 2nd bit, "PSH" for 3rd bit, "ACK" for 4th bit, and "URG" for 5th bit. Further, as shown in FIG. 12(C), the IP header protocol is set to "6" to indicate a TCP protocol.

As shown in FIG. 13, a header of TCP packet may be composed of a header portion (or TCP header) and data portion. The TCP header may include a source port number field (Source Port, 16 bits), a destination port number field (Destination Port, 16 bits), a sequence number field (Sequence Number, 32 bits), an acknowledgement response number field (Acknowledgement Number, 32 bits), a data offset field (Data Offset, 4 bits), a reserved field (Reserved, 6 bits), a code bit field (6 bits), a window size field (Window, 16 bits), a checksum field (Checksum, 16 bits), and an urgent pointer field (Urgent Pointer, 16 bits). Further, the TCP header may include "Option" and "Padding" in some case and, then the data is placed after the TCP header. The source port number stored in the source port number field, and the destination port number stored in the destination port number field may be used for identifying types of application (i.e., identification of application). Further, the source port number field and the destination port number field may store port numbers, which are well known port number defined in a standard of RFC 1700. A detail of TCP is defined in a standard of RFC 793.

ICMP Packet

Figure 14:
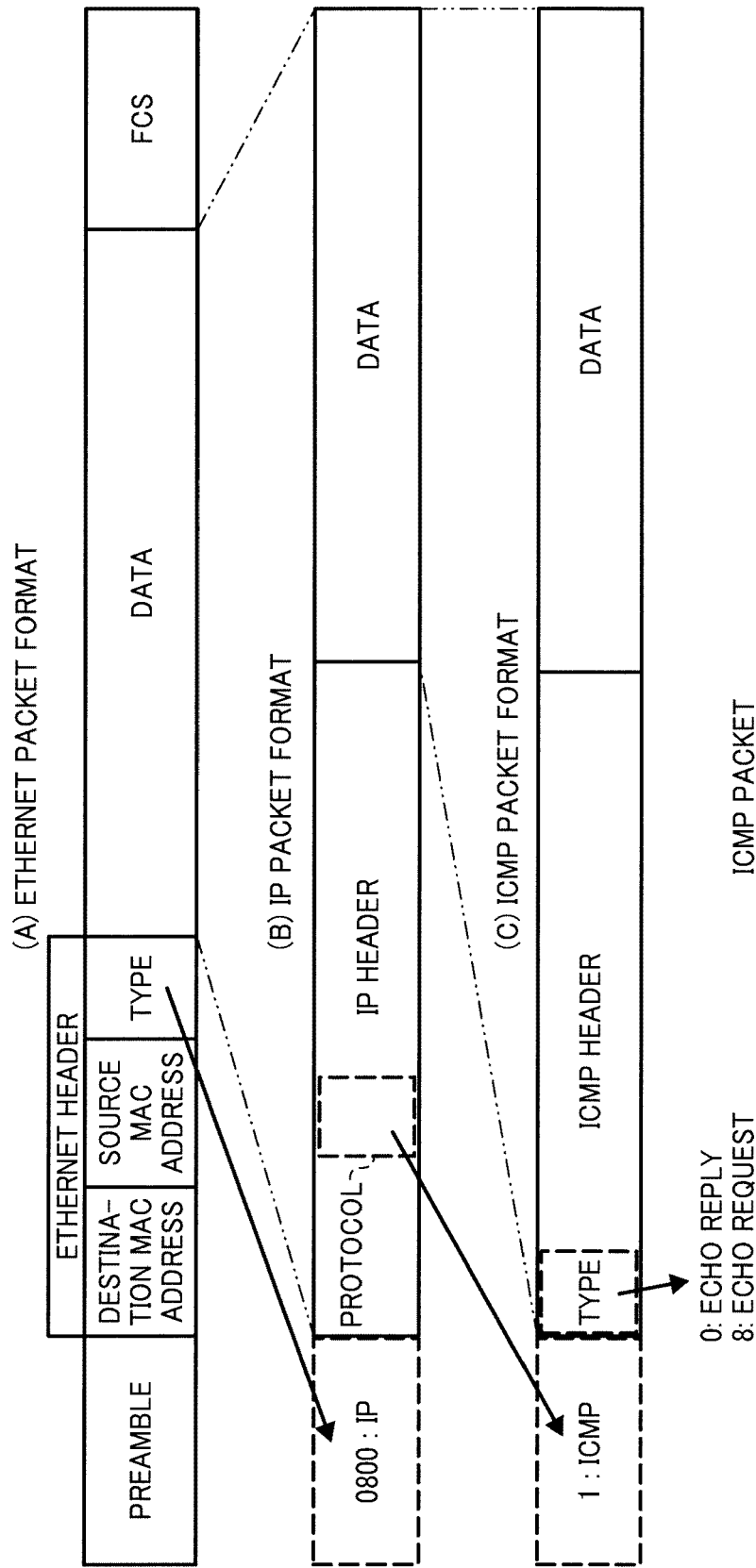
FIG. 14 shows a format of IP packet and a format of ICMP echo request/ICMP echo-reply packet for Ethernet frame of FIG. 8.
Figure 15:
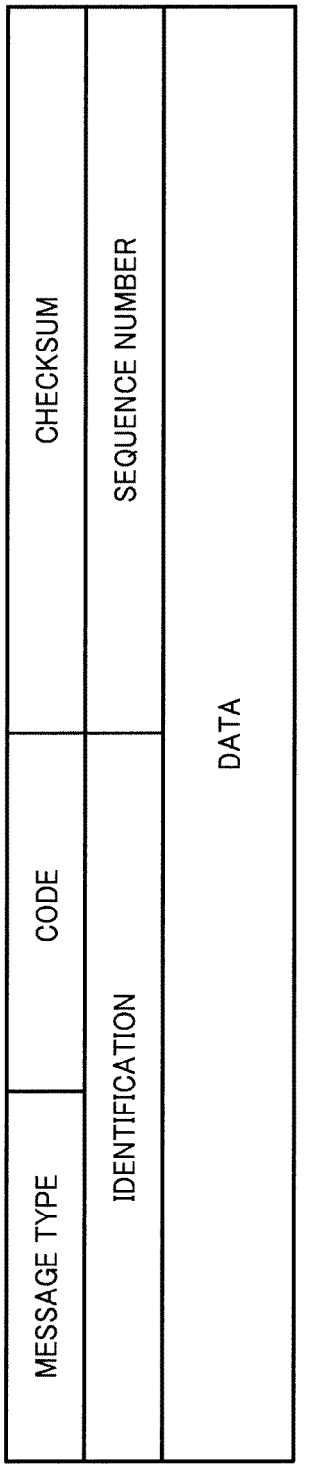
FIG. 15 shows data type for each field in the ICMP echo request and ICMP echo-reply packet.

FIG. 14(A) shows an example format of Ethernet packet, FIG. 14(B) shows an example format of IP packet of Ethernet frame, and FIG. 14(C) shows an example format of ICMP (internet control message protocol) packet. Further, FIG. 15 shows data type for each field in ICMP echo request and ICMP echo-reply packet. FIG. 14(B) shows an example ICMP packet frame, in which "0x0800" is set in "type" of Ethernet header of Ethernet frame, which is indicated with a dotted line in FIG. 14(B). As for an ICMP packet, "IP header" and "data" are included in "data" of the Ethernet frame as shown in FIG. 14(B) as similar to the above-described TCP packet and UDP packet. As for an ICMP packet, the IP header stores data of "1" to the protocol to designate ICMP as protocol, and "data" of the IP packet includes "ICMP header" and "data" as shown in FIGS. 14(A) and 14(C). Further, the "type" of ICMP header may store "8" for an ICMP echo-request packet, and "0" for an ICMP echo-reply packet. Further, the code bit of ICMP header for the ICMP echo-request packet and the ICMP echo-reply packet may be set to "0" constantly. Further, data of the ICMP packet may have a given length, in which a data length of 64 bytes may be used typically.

FIG. 15 shows data type for each field for the ICMP echo-request packet and the ICMP echo-reply packet. The ICMP echo-request packet may include a "message type" field, a "code field", a checksum field, an "identification" field, a sequence number field, and data, for example. Similarly, the ICMP echo-reply packet may also include a "message type" field, a "code field", a checksum field, a "identification" field, a sequence number field, and data, for example. Such ICMP echo packet may be prepared using known process. The "message type" field may store "8" for the ICMP echo-request packet, and "0" for the ICMP echo-reply packet. The "code field" may constantly store "0" for the ICMP echo-request packet and the ICMP echo-reply packet as above mentioned.

ARP Packet

Figure 16:
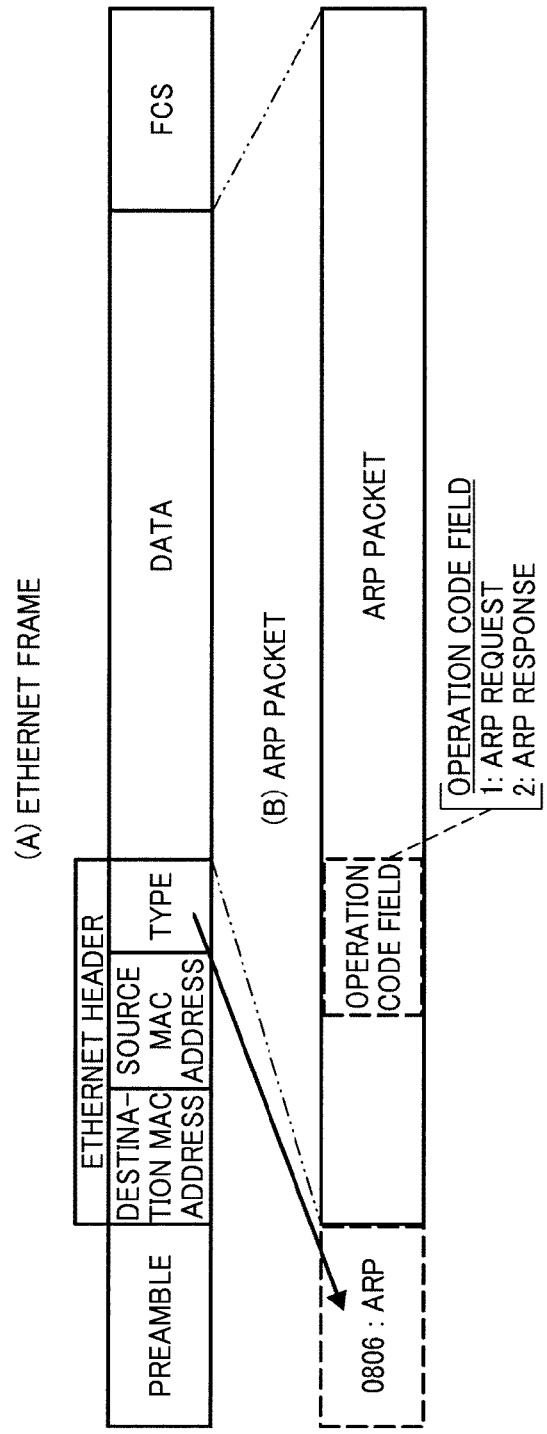
FIG. 16 shows an example format of ARP packet in Ethernet frame of FIG. 8.

FIG. 16 shows an example format of ARP (address resolution protocol) packet in the Ethernet frame. Reference (B) of FIG. 16 shows an example ARP packet frame, in which "0x0806" is set in "type" of Ethernet header of Ethernet frame, which is indicated with a dotted line in reference (B). As for an ARP packet, ARP packet is included in "data" of the Ethernet frame as shown in reference (B). As shown in reference (B), "data" of Ethernet frame may include an operation code field and the ARP packet. When the operation code field stores "1," an ARP request packet is set, and when the operation code field stores "2," an ARP response packet is set, for example.

Figure 17:
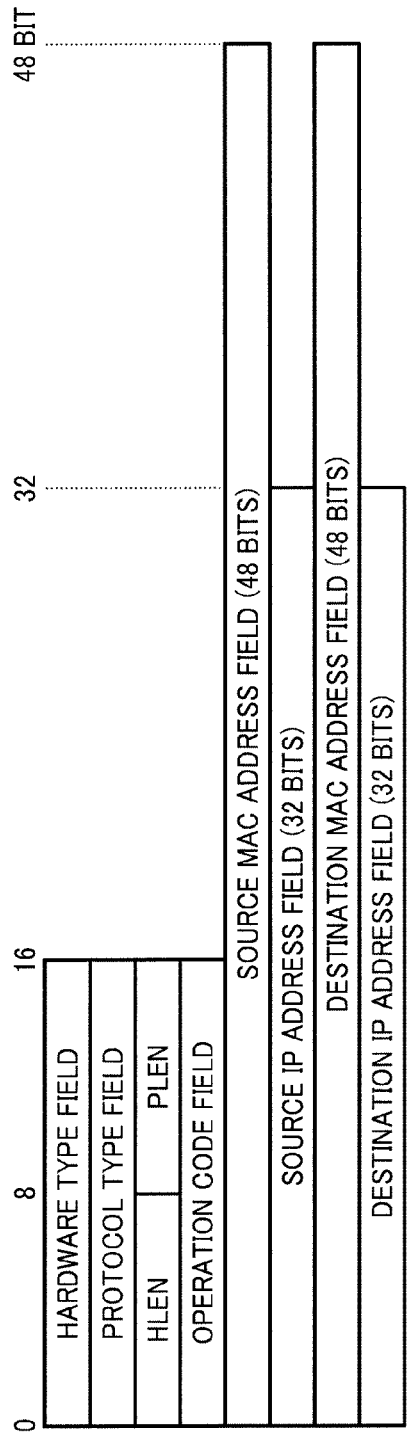
FIG. 17A shows a format of ARP packet.
FIG. 17B shows data type for each field in ARP packet.

FIG. 17A shows an example format of ARP packet, and FIG. 17B shows data type for each field in the ARP packet. As shown in FIG. 17A, the ARP packet may include a "hardware type" field, a "protocol type" field, a MAC Address length ("HLEN") field, a protocol address length ("PLEN") field, an operation code field, a source MAC Address field, a source IP address field, a destination MAC Address field, and a destination IP address field, for example.

As shown in FIG. 17B, the "hardware type" field may have a data length of 16 bits, and may store "1" for Ethernet, for example. The "protocol type" field may have a data length of 16 bits, and use IP address: the "protocol type" field may store "2048" for IPv4 protocol, for example. The MAC Address length ("HLEN") field may have a data length of 48 bits, and may store 6-byte data indicating MAC Address, for example: the MAC Address length ("HLEN") field may store "6" for IPv4 protocol, for example. The protocol address length ("PLEN") field may have a data length of 32 bits, and may store "4" for IPv4 protocol, for example.

The operation code field may have a data length of 16 bits, and may set "1" for ARP request, and "2" for ARP reply. The source MAC Address field, the source IP address field, the destination MAC Address field, and the destination IP address field may have data length of 48, 32, 48, 32 bits respectively, and store the source MAC Address, the source IP address, the destination MAC Address, and the destination IP address, respectively.

Packet Engine Unit of First Exemplary Embodiment

A description is now given to the packet engine unit 24 (PE 24) according to a first exemplary embodiment, which can be operable under the energy-saving mode. In a first exemplary embodiment, the PE 24 can generate and transmit a packet to the network automatically at a given time, which may be set as an given time interval when the power-supply mode is set to the energy-saving mode. Specifically, after the power-supply mode shifts to the energy-saving mode, without activating the CPU 20 cut from the power-supply, the PE 24 can generate a DHCP REQUEST packet, and transmit the DHCP REQUEST packet to the network on a periodic basis, wherein such periodic basis may be set in advance as a transmission time interval so that the PE 24 can receive a reply packet as a response to the DHCP REQUEST packet. If the PE 24 cannot receive a reply packet when a given time period elapses after transmitting the DHCP REQUEST packet to the network, the PE 24 may transmit the same DHCP REQUEST packet to the network again under the energy-saving mode (i.e., re-transmission of packet).

Figure 18:
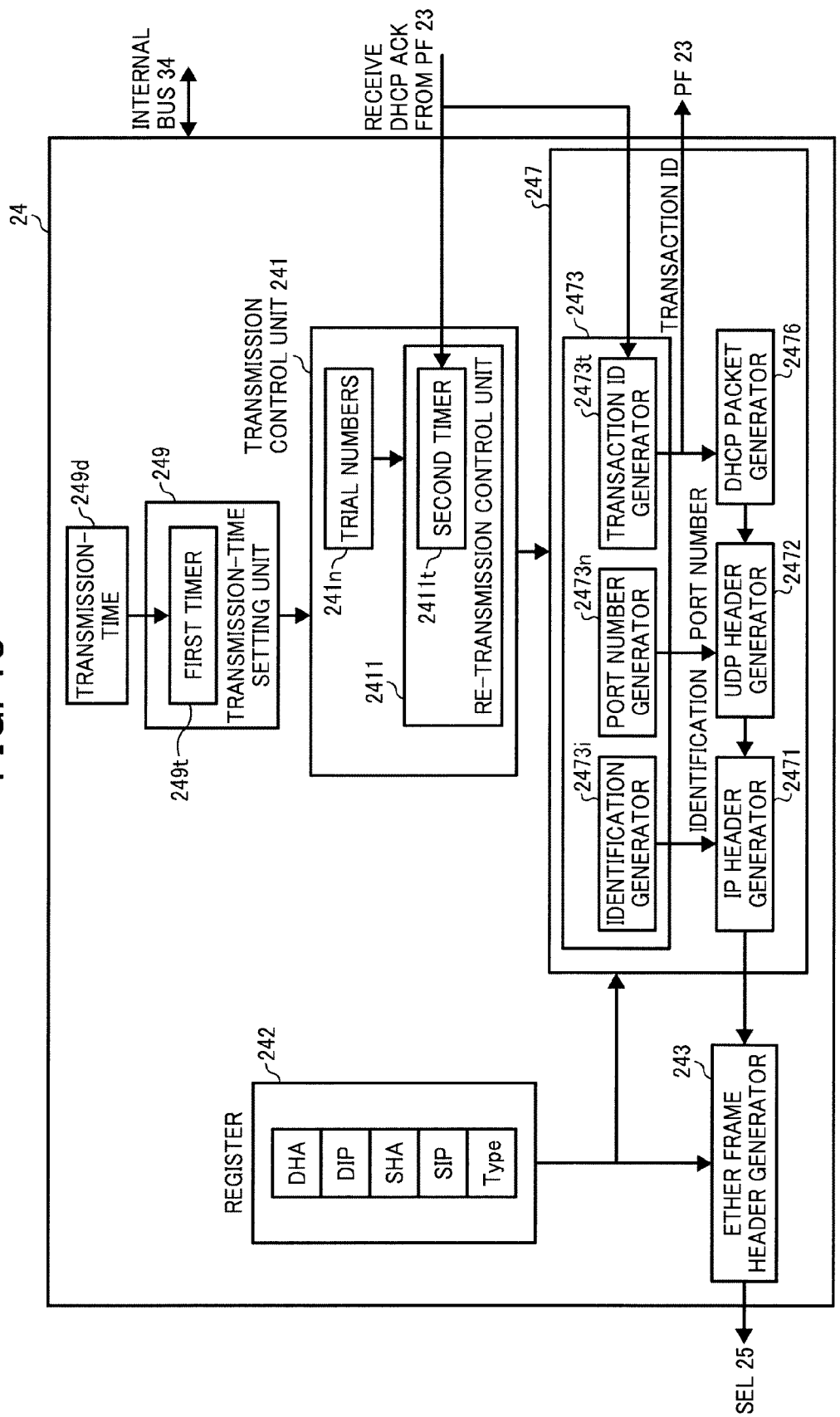
FIG. 18 shows a block diagram of a packet engine unit of FIG. 1.

FIG. 18 shows a block diagram of the PE 24 according to a first exemplary embodiment. The PE 24 may include a transmission control unit 241, a register 242, an Ethernet frame header generator 243, an IP packet generator 247, and a transmission-time setting unit 249, for example. The transmission control unit 241 controls the transmission-time setting unit 249 including a first timer 249t so that the PE 24 can generate a DHCP REQUEST packet (as IP packet) on a periodic basis, wherein such periodic basis may be set as a transmission time interval by the first timer 249t.

Further, the transmission control unit 241 may include a re-transmission control unit 2411. In a normal condition, the PE 24 can transmit a DHCP REQUEST packet to the network on a periodic basis, and such periodic packet transmission can be continued as long as the DHCP ACK packet, responding to the DHCP REQUEST packet, can be received by the PE 24, by which required data can be obtained. However, if the PE 24 cannot receive a reply packet when a given time period elapses after transmitting the DHCP REQUEST packet to the network, the PE 24 may stop a periodic packet transmission, and then the PE 24 may conduct a re-transmission of the same DHCP REQUEST packet again. The re-transmission control unit 2411 including a second timer 2411t is used to conduct such re-transmission. Specifically, a given time period is set to the second timer 2411t, and if the PE 24 cannot receive a reply packet when the given time period elapses after transmitting the DHCP REQUEST packet to the network, such re-transmission is conducted. The re-transmission control unit 2411 may conduct such re-transmission up to a given number of times, which may be set as a trial number in the trial numbers 241n as a maximum number of times for re-transmission trial. An operation of the transmission control unit 241 will be described later with reference to FIGS. 22 and 23.

The IP packet generator 247 may include an identification data generator 2473, a DHCP packet generator 2476, an UDP header generator 2472, and an IP header generator 2471, for example.

The identification data generator 2473 may include a transaction ID generator 2473t, a port number generator 2473n, and an identification generator 2473i, for example. The transaction ID generator 2473t generates a transaction ID used for DHCP REQUEST packet. The port number generator 2473n generates a port number used for UDP packet. For example, the port number generator 2473n generates a port number of 67 for a source port number, and a port number of 68 for a destination port number, respectively. The identification generator 2473i generates "identification" used for IP packet. Such transaction ID, the port number, and "identification" may be included in a category of identification data in the present invention.

The DHCP packet generator 2476 generates a DHCP REQUEST packet using a transaction ID generated by the transaction ID generator 2473t, in which DHCP REQUEST packet may be used as a message data.

The UDP header generator 2472 generates a UDP header having a source port number, a destination port number, a segment length, and a checksum shown in FIG. 11. The destination port number and the source port number generated by the port number generator 2473n are used for generating the UDP header. The segment length may be set with UDP data length. Because the UDP data is used as a DHCP REQUEST packet, a data length of DHCP REQUEST packet can be used to set the segment length. The checksum is set with a string of one's complement of a UDP header and UDP data with 16 bits. The checksum can be computed by a known complement computation method.

The IP header generator 2471 generates a header of the IP packet without "Option," "Padding," and data portion of the IP packet format shown in FIG. 10. As data used for generating the IP packet header, followings may be set in advance. For example, an apparatus-designated IP address of the image forming apparatus is set to SIP of the register 242, and an apparatus-designated hardware address of the image forming apparatus is set to SHA of the register 242. Further, the IP address of the DHCP Server is set to DIP of the register 242, and the hardware address of the DHCP Server is set to DHA of the register 242 (refer to a description of step S107 shown in FIG. 5 for such settings to the register 242).

The "Type of Service" of the IP packet format (see FIG. 10) may be set to "0x800" for indicating IP. The version is set to "4," and the header length is set to "5," and the "Type of Service" is set to "0," for example. The packet length is a sum of an IP header length, an UDP header length, and an UDP data length. Further, "identification" may be set with an identification generated by the generator 2473i of the identification data generator 2473. The "identification" can be generated as a new one at every time when an IP packet is transmitted. Further, "flag" is set with "division is not allowed", "no subsequent fragment," and "fragment offset" is set with "0." The "Time To Live" may be set to "255," which is a maximum value. The "protocol" may be set to 17 for indicating "UDP". The "header checksum" may be obtained by computing checksum of the IP header and data. The source IP address and the destination IP address are respectively set to SIP and DIP in the register 242. Further, "Option" may not be generated for the header.

The Ethernet frame header generator 243 generates a header of an Ethernet frame by extracting the destination MAC Address from "DHA" and the source MAC Address from "SHA" set in the register 242, and "type" from TYPE, and set such information to relevant fields in the Ethernet frame. Because the MAC 22 can generate FCS of Ethernet packet automatically, the IP packet generator 247 does not need to generate FCS. Further, the Ethernet frame header generator 243 may generate a packet frame by combining such header of Ethernet frame and message data generated by the IP packet generator 247 so that such packet frame can be transmitted from the packet engine unit 24 to the SEL 25. As such, the Ethernet frame header generator 243 may be referred to a packet frame generator.

When the image forming apparatus is set to the energy-saving mode, the PM 32 instructs the SEL 25 to use data that is output from the PE 24. On the contrary, when the PM 32 shifts the power-supply mode from the energy-saving mode to the normal mode, the SEL 25 may receive an instruction and data via the internal bus 34, in which the CPU 20 controls such operation, and then the SEL 25 receives data from the internal bus 34, and outputs the data to the MAC 22. Accordingly, data is not input to the SEL 25 from the PE 24 during the normal mode.

As such, when the image forming apparatus is set to the energy-saving mode, an Ethernet packet including IP packet (e.g., DHCP REQUEST) generated by the PE 24 can be transmitted to the network via the selector 25, the MAC 22, and the PHY 12.

Packet Filter According to a First Exemplary Embodiment

Under the energy-saving mode, the PE 24 according to an first exemplary embodiment generates a DHCP REQUEST packet automatically at a given time, which may be set as an given time interval, and transmits the DHCP REQUEST packet to the network on a periodic basis, wherein such periodic basis may be set as a transmission time interval in advance. Then, a reply packet may be sent back from the network as a response to the DHCP REQUEST packet transmitted from the PE 24, and such reply packet may need to be received by the packet filter 23. Accordingly, the packet filter 23 may have a function to detect a DHCP ACK packet and a DHCP NAK packet, wherein the DHCP ACK packet and DHCP NAK packet may be received as a response to the DHCP REQUEST packet issued by using DHCP protocol. When the packet filter 23 detects the DHCP ACK or DHCP NAK packet, an operation mode may be changed. For example, the energy-saving mode may be maintained and the PE 24 may continue a transmission of DHCP REQUEST packet on a periodic basis, or the power-supply mode is shifted from the energy-saving mode to the normal mode, and the CPU 20 may conduct a given setting process such as for example setting IP address for DHCP Server (see a flowchart of FIG. 5). An operation of the PE 24 and the packet filter 23 under the energy-saving mode will be described later with flowcharts shown in FIGS. 22 and 23.

Figure 19:
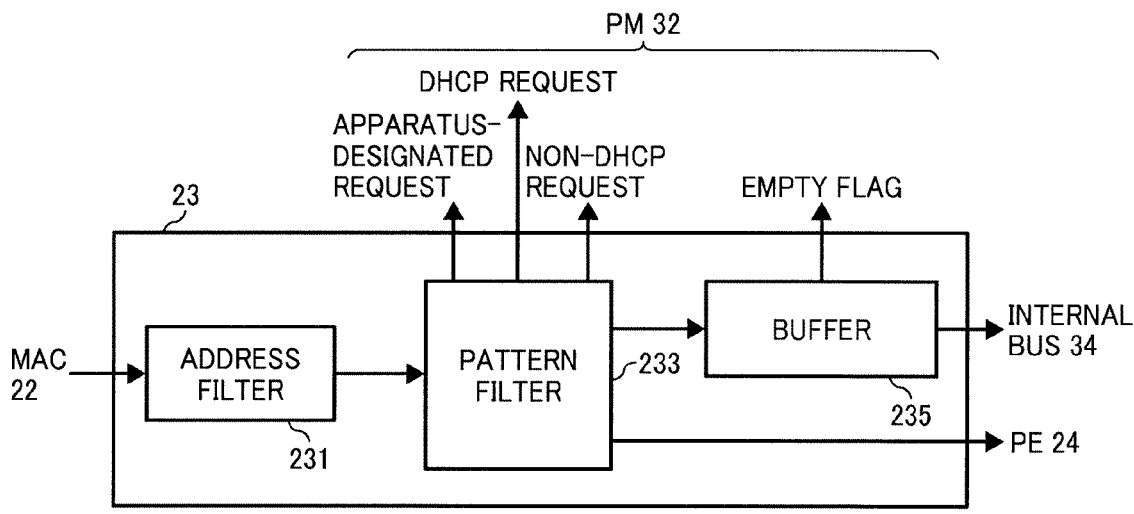
FIG. 19 shows a block diagram of a packet filter of FIG. 1.

FIG. 19 shows a block diagram of the packet filter 23 according to a first exemplary embodiment. The packet filter 23 may include an address filter 231, a pattern filter 233, and a buffer 235, for example.

The address filter 231 can be registered with a unicast address and a multicast address. Further, an address can be set address for the image forming apparatus itself and an accessible device (e.g., plotter 2) provided in the image forming apparatus. The address filter 231 checks "type" of packet, input from the MAC 22, and determines types of packet based on the "type" information to check address information set in the packet to select which packet is let through the address filter 231 and then transmitted to the pattern filter 233, and which packet is not transmitted to the pattern filter 233 and destroyed. With such configuration, a packet that is accessible to an apparatus or device is only let through the address filter 231 and then transmitted to the pattern filter 233. Further, a broadcast packet can be let through the address filter 231 without no relevancy to a setting of the address filter 231, and then transmitted to the pattern filter 233.

A packet having the apparatus-designated address is a packet that can be let through the address filter 231. Accordingly, the apparatus-designated address may include a registered unicast address (e.g., IP address for the image forming apparatus or device in the image forming apparatus), a registered multicast address, and a broadcast address, for example.

The pattern filter 233 may include a masked area and a not-masked area. The not-masked area may be set with comparison data set each one of bytes. The masked area may be set for each one of bytes, and the masked area is assumed as a matched condition without no relevancy to data in packet. A total data length of masked area and a data length of not-masked area becomes a pattern-filter length. For example, the pattern-filter length may become 256 bytes. The pattern filter 233 can be set with an offset value used for pattern offset. One offset value for pattern offset is "1," and such value becomes an offset length from a start of Ethernet frame. If a filtering process by the pattern filter 233 is started from "type" of Ethernet frame, a length of pattern offset 1 becomes a sum of the destination MAC address length and the source MAC address. Another pattern offset (i.e., pattern offset 2) may be used as an offset which is from a start of the pattern filter 233. A one (1) byte from a pattern offset can be filtered for each of bits by setting a bitmask value for each bit. A bit corresponding to a bitmask value of "1" is a masked area.

Figure 20:
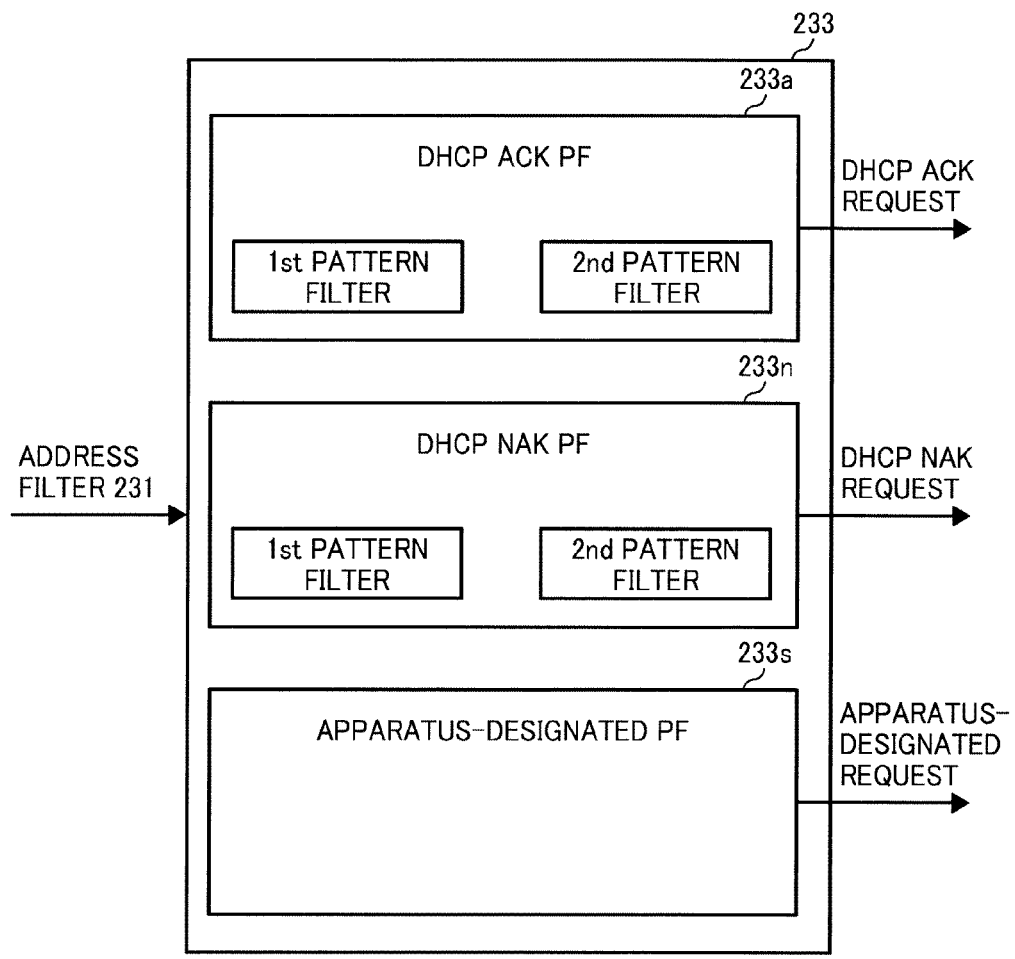
FIG. 20 shows a block diagram of a pattern filter in the packet filter of FIG. 19.

FIG. 20 shows a block diagram of the pattern filter 233 of FIG. 19. The pattern filter 233 may include a plurality of pattern filters, such as for example, a DHCP ACK packet filter 233a (DHCP ACK PF 233a), a DHCP NAK PF 233n (DHCP NAK PF 233n), and an apparatus-designated packet filter 233s (apparatus-designated PF 233s). The pattern filter 233, input with a packet passed through the address filter 231, outputs a DHCP ACK request, a DHCP NAK request, or an apparatus-designated request.

Because the address filter 231 filters a packet that can be let through to the pattern filter 233, the pattern filter 233 may detect a packet, which is other than DHCP ACK and DHCP NAK, as an apparatus-designated packet. Accordingly, if a packet received by the pattern filter 233 is not a DHCP ACK request, detectable by the DHCP ACK PF 233a, and not a DHCK NAK request, detectable by the DHCP NAK PF 233n, the pattern filter 233 may recognize such packet as an apparatus-designated request, and output such apparatus-designated request to the PM 32.

Figure 21:
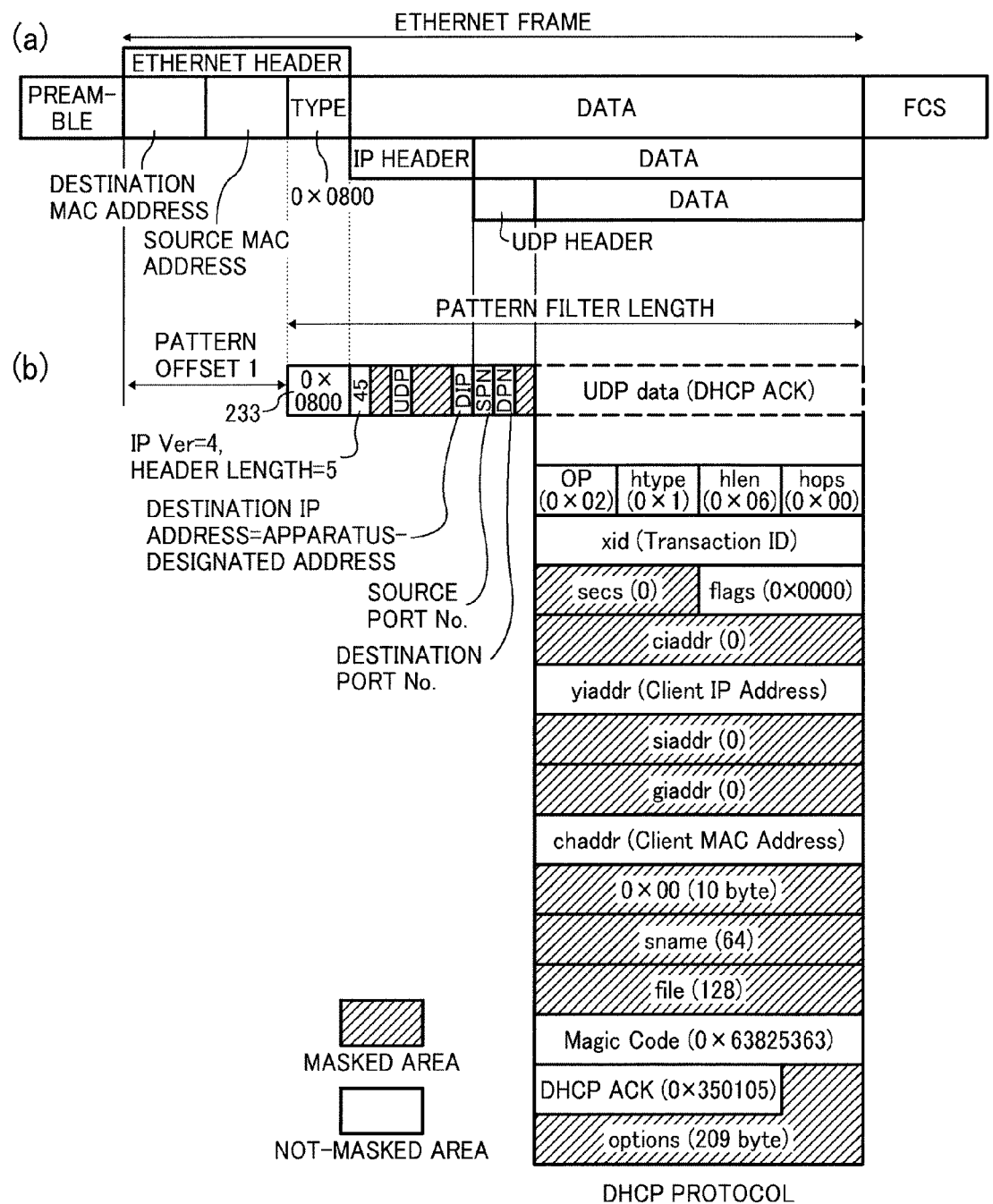
FIG. 21 shows a filtering process for UDP packet using DHCP protocol in the pattern filter of FIG. 20.

A description is now given to a filtering process of the pattern filter 233. Specifically, a filtering process for DHCP ACK packet conducted by the pattern filter 233 is described with reference to FIG. 21. FIG. 21(a) shows an format of network frame for UDP packet (see FIG. 9(A) and FIG. 3), and FIG. 21(b) shows a packet processed by the pattern filter 233 of the packet filter 23 under a processing condition using a masked area and a not-masked area, and data used in the not-masked area. The DHCP ACK packet typically employs a configuration of UDP data conformed to DHCP protocol, wherein the UDP data is shown in FIG. 4. In an exemplary embodiment, because the DHCP ACK packet has a length of 256 bytes or more, the DHCP ACK packet filter 233a may use a first pattern filter and a second pattern filter, for example.

As shown in FIG. 21, in the first pattern filter of the DHCP ACK PF 233a, a pattern offset 1, obtained by adding the destination MAC address length and the source MAC address length, is set. The first 16 bits of UDP packet (Ethernet header), corresponding to TYPE in an Ethernet frame, is set as a not-masked area, and the first 16 bits of UDP packet is set with 0x800 indicating IP protocol. After checking the TYPE of Ethernet header, the IP header of Ethernet frame is checked. Specifically, the pattern filter 223 may be set with "4" for IPv4 and header length of "5" set in the version (Ver) of IP header, UDP protocol number in the protocol number, and IP address (i.e., apparatus-designated address) of the image forming apparatus in the destination IP address, respectively. Other portion of the pattern filter 223, corresponding to an area of the IP header, may be set as masked area (see shaded portion in FIG. 21).

Then, the pattern filter 223 may be set with values to be compared with UDP header. In the pattern filter 223, a port number using DHCP protocol is set to compare the number with the UDP header of Ethernet frame; the destination port number may be set to "67," and the source port number may be set to "68," for example. Other portion of the pattern filter 223, corresponding to an area of the UDP header, may be set as masked area. Further, a portion of the pattern filter 233 disposed after the UDP header area is also set as a masked area. Further, because the UDP data area of the pattern filter 233 corresponds to DHCP ACK, "OP", "htype", "hlen", "hops", "xid", "flags", "yiaddr" and "chaddr" of the DHCP ACK packet are used as a not-masked area. For example, "OP" is set with 0x02, "htype" is set with 0x01, "hlen" is set with 0x06, "hops" is set with 0x00, "xid" is set with Transaction ID generated by a the transaction ID generator 2473t of the PE 24, "yiaddr" is set to SIP of the register 242 because of Client IP address, and "chaddr" is set with SHA of the register 242 because of Client MAC address. Areas of "secs", "ciaddr", and "giaddr" of DHCP ACK protocol are set as masked area.

Further, in the second pattern filter of the DHCP ACK PF 233a, a pattern offset 1 may be set to 236, for example. 236 can be obtained by adding Ethernet header length (composed of destination MAC address length, source MAC address length, and length of "TYPE"), IP header length, UDP header length, and a length from a start of "OP" to "file" of DHCP ACK packet set in UDP data area. A not-masked area may be set for Magic Code (0x63825363), and DHCP ACK (0x350105), for example. Other portion may be set as masked area. As such, pattern filtering condition can be set for each of the first and second pattern filters separately for a packet area. If a pattern filtering condition, set by a filtering processes conducted by both of the first and second pattern filters, and a packet received by the image forming apparatus matches each other, it is detected as DHCP ACK protocol. Accordingly, by conducting an "AND" operation for the processing result by the first and second pattern filters, DHCP ACK can be detected, and then a DHCP ACK request can be generated.

A description is now given to a filtering process for DHCP NAK packet is described. Because a DHCP NAK packet may have a packet length of 256 bytes or more, the DHCP NAK PF 233n may also employ a first and second pattern filters, for example. The first pattern filter of the DHCP NAK PF 233n may be set with a pattern filtering condition same as the first pattern filter for the DHCP ACK PF 233a. Further, in the second pattern filter of the DHCP NAK PF 233n, a pattern offset 1 may be set to 236, for example. 236 can be obtained by adding Ethernet header length (composed of destination MAC address length, source MAC address length, and length of "type"), IP header length, UDP header length, and a length from a start of OP of DHCP ACK packet to "file" of DHCP ACK packet for UDP data area. A not-masked area may be set for Magic Code (0x63825363), and DHCP NAK (0x350106), for example. Other portion may be set as masked area. As such, pattern filtering condition can be set for each of the first and second pattern filters separately for a packet area. If a pattern filtering condition, set by filtering processes conducted by both of the first and second pattern filters, and a packet received by the image forming apparatus matches each other, it is detected as DHCP NAK protocol. Accordingly, by conducting an "AND" operation for the processing result by the first and second pattern filters, DHCP NAK can be detected, and then a DHCP NAK request can be generated.

Communication Using DHCP Protocol Under Energy-Saving Mode (First Exemplary Embodiment)

A description is now given to an operation of the packet engine unit 24 (PE 24) and the packet filter 23 (PF 23) used under the energy-saving mode with reference to FIG. 22, which shows an example flow chart for communication control.

In the process shown in FIG. 22, during the energy-saving mode, the PE 24 transmits a DHCP REQUEST packet on a periodical basis, and the packet filter 23 detects a DHCP ACK packet or a DHCP NAK packet, which is sent back from a destination apparatus as a response message or packet for the transmitted DHCP REQUEST packet. Based on a detection result of the packet filter 23, a process for maintaining a communication status with the destination apparatus may be conducted automatically at a given time, which may be set as an given time interval. Under the energy-saving mode, the CPU 20 may not be operable.

In a first exemplary embodiment, before the power-supply mode is shifted to the energy-saving mode, the CPU 20 may set given values for operating the packet engine unit 24 (PE 24) and the packet filter 23 (PF 23), and then the power-supply mode is shifted to the energy-saving mode. Further, if a DHCP ACK response is issued for a DHCP REQUEST, transmitted during the energy-saving mode, a process for maintaining a communication status using DHCP protocol may be conducted while the energy-saving mode is maintained. Further, if a DHCP NAK response or no response is issued for a DHCP REQUEST transmitted during the energy-saving mode, the power-supply mode may be shifted to the normal mode, and then the CPU 20 may conduct an operation for checking communication status.

Accordingly, the CPU 20 activates a process program to be used for maintaining a communication status by transmitting DHCP REQUEST packet on a periodical basis under the energy-saving mode, and sets given values required for maintaining a communication status, and then the power-supply mode is shifted to the energy-saving mode and the CPU 20 is cut from a power-supply.

At step S201, the CPU 20 sets a time-interval value to the first timer 249t of the transmission-time setting unit 249 in the PE 24, wherein a packet may be transmitted on a periodical basis with such time-interval. The time-interval may be set based on a standard of RFC 2131 defined for DHCP protocol. For example, the time-interval value may be set to a half value of the lease time of IP address.

At step S202, based on a standard of RFC 2131, the re-transmission trial numbers 241n is set to a given number of times (e.g., 4) so that the PE 24 can instruct the transmission control unit 241 to re-transmit a DHCP REQUEST packet for a given number of times.

At step S203, the second timer 2411t of the re-transmission control unit 2411 is initially set with a given time value (e.g., 4 seconds), for example.

At step S204, the PE 24 instructs a port number generator 2473n in the identification data generator 2473 to set a port number for UDP protocol, which is used for transmitting DHCP REQUEST packet. For example, the port number generator 2473n sets "68" for Source Port, and "67" for Destination Port.

At step S205, the CPU 20 sets an IP "identification" to the identification generator 2473i in the PE 24, wherein "identification" is used for a next packet transfer using TCP/IP network.

At step S206, the CPU 20 sets a transaction ID to the transaction ID generator 2473t of the PE 24, wherein transaction ID is used for a next DHCP REQUEST packet transfer.

At step S207, a given condition is set to the identification data generator 2473 of the PE 24 to generate a DHCP REQUEST packet so that the DHCP REQUEST packet can be transmitted on a periodical basis under the energy-saving mode. DHCP REQUEST generates a packet having UDP data using a program which requests extension of communication, wherein such program is shown in FIG. 6 (refer to FIGS. 2 to 5 for DHCP protocol when the power source is turned to ON). Specifically, a Client IP address is set with a SIP value stored in the register 242. A Client MAC address is set with a SHA value stored in the register 242. The DHCP packet generator 2476 generates a DHCP REQUEST packet (see FIG. 6) using a transaction ID generated by the transaction ID generator 2473t.

At step S208, the packet filter 23 is set with a given condition for detecting a DHCP ACK packet and DHCP NAK packet so that the packet filter 23 can detect the DHCP ACK and DHCP NAK sent from a destination apparatus as a response for the DHCP REQUEST packet transmitted to the destination apparatus.

The DHCP ACK sets a processing condition for filtering process, in which UDP data shown in FIG. 21 is used and a transaction ID generated by the transaction ID generator 2473t is used. With such a setting, a DHCP ACK packet can be detected using the first and second pattern filters as above-described for the pattern filter 233. Further, as for a processing condition for filtering process of DHCP NAK packet, a transaction ID generated by the transaction ID generator 2473t is used. With such a setting, a DHCP NAK packet can be detected using the first and second pattern filters as above-described for the pattern filter 233.

The timer 33, activated on a given timing by the power management unit 32, is used to detect whether a given time elapses during the normal mode. If the packet filter 23 does not receive an apparatus-designated data and all applications running on the CPU 20 are in an idle condition when the given time elapses, the CPU 20 informs such status to the PM 32.

At step S209, upon receiving such information, the PM 32 shifts the power-supply mode to the energy-saving mode.

At step S210, the CPU sets a given condition to the so that the SEL 25 receives data from the PE 24, and transmits the data to the MAC 22 during the energy-saving mode. With such setting, a DHCP REQUEST packet can be transmitted to the network during the energy-saving mode.

When the power-supply shifts to the energy-saving mode, the PE 24 starts to transmit a DHCP REQUEST packet on a periodical basis. At step S211, the first timer 249t is activated. At step S212, it is checked whether the activated first timer 249t is out, which means the time value set to the first timer 249t is exhausted. If the first timer 249t is out (YES at step S212), a new DHCP REQUEST packet is issued.

To issue a new DHCP REQUEST packet, a new transaction ID generated by the transaction ID generator 2473t is set to the pattern filter 233 of the packet filter 23, used for a filtering process of DHCP ACK. At step S213, a new transaction ID is set to the pattern filter 233 so that a DHCP ACK packet, which may be transmitted in response to the DHCP REQUEST packet, can be detected by the pattern filter 233.

At step S214, the second timer 2411t in the transmission control unit 241 is activated. Such process is required to confirm whether a DHCP ACK packet is received within a given time period set by the second timer 2411t after transmitting the DHCP REQUEST packet.

At step S215, the transmission control unit 241 requests the IP packet generator 247 to transmit a DHCP REQUEST packet. After receiving such request for transmitting DHCP REQUEST packet, the IP packet generator 247 conducts a series of processes to generate a DHCP REQUEST packet.

At step S216, the DHCP packet generator 2476 generates UDP data for the DHCP REQUEST packet (see FIG. 6) using the transaction ID generated by the transaction ID generator 2473t, in which the DHCP REQUEST packet may be used as a message data.

At step S217, the UDP header generator 2472 generates a UDP header. Such generated UDP header and UDP data are combined and used as IP data.

At step S218, the IP header generator 2471 generates an IP header using "identification" generated by the identification generator 2473i. Such IP data and IP header becomes data portion of Ethernet frame.

At step S219, the Ethernet frame header generator 243 generates an Ethernet frame header, and then combines the Ethernet frame header and the data portion of Ethernet frame to generate a DHCP REQUEST packet configuring Ethernet frame.

At step S220, the PE 24 outputs the generated DHCP REQUEST packet to the SEL 25, and then the DHCP REQUEST packet is output to the network via the MAC 22 and the PHY 12.

After such DHCP REQUEST packet transmission, the packet filter 23 may detect a DHCP ACK packet or a DHCP NAK packet, sent back from a destination apparatus as a response for the DHCP REQUEST packet.

At step S221, it is checked whether the packet filter 23 detects a DHCP ACK packet. If the DHCP ACK packet is not detected (NO at step S221), it is checked whether the packet filter 23 detects a DHCP NAK packet at step S222. If the DHCP NAK packet is not detected (NO at step S222), it is checked whether the second timer 2411t is out at step S223. If the second timer 2411t is not out (No at step S223), the process goes back to step S221 to check whether the packet filter 23 detects a DHCP ACK packet.

If the DHCP ACK packet is detected at step S221 (YES at step S221), the process goes to step S231 to set a next DHCP REQUEST packet to be transmitted with a given transmission procedure.

At step S231, the transaction ID set in the transaction ID generator 2473t of the PE 24 is updated to set a new transaction ID for a next DHCP REQUEST packet to be transmitted to the network. A new transaction ID can be set by adding "1" to the present transaction ID, for example.

At step S232, the IP "identification" set in the identification generator 2473i in the PE 24 is updated to set a new IP "identification" used for a next packet transmission using the TCP/IP network. A new IP "identification" can be set by adding "1" to the present IP "identification", for example. Then, the process goes back top step S211 to re-activate the first timer 249t to start a next transmission process for a next DHCP REQUEST packet. As long as the DHCP ACK packet can be kept detected, such DHCP REQUEST packet transmission can be repeated using the above-described steps.

If the DHCP NAK packet is detected at step S222 (YES at step S222), a new communication is need to be established because a detection of DHCP NAK packet may indicate an error on communication status with a destination apparatus.

At step S241, when the packet filter 23 detects the DHCP NAK packet, the packet filter 23 notifies a DHCP NAK request to the PM 32. When the PM 32 receives the DHCP NAK request, the PM 32 shifts the power-supply mode (or power-consumption mode) from the energy-saving mode to the normal mode. When the power-supply mode is shifted to the normal mode, the CPU 20 can be set to an operable condition.

At step S242, the PE 24 notifies the "identification" used for the low-power mode, and the transaction ID used for the low-power mode to the CPU 20, and the packet filter 23 notifies a detection of DHCP NAK packet to the CPU 20. After such notification, the control flow process ends.

When the CPU 20 is notified a detection of DHCP NAK packet, the CPU 20 may establish another communication with the DHCP Server by conducting a process shown in FIG. 2. As shown in FIG. 2, a new DHCP Discover command may be broadcasted using DHCP protocol to set an IP address for the DHCP Client using the DHCP Server, by which another communication may be established between the DHCP Client and the DHCP Server.

Further, when the power-supply mode is returned to the normal mode, the "identification" and transaction ID used in the low-power mode can be notified to the CPU 20. Accordingly, the CPU 20 can set another "identification" and another transaction ID for the normal mode, which means the "identification" and transaction ID for the low-power mode and the normal mode may not become a same "identification" and transaction ID. Accordingly, communication can be conducted using TCP/IP protocol without a confusion problem of the "identification" and transaction ID.

Further, if none of DHCP ACK packet and DHCP NAK packet is detected, and the second timer 2411t is out at step S223 (YES at step S223), the DHCP REQUEST packet can be re-transmitted for a given number of trial times set by the re-transmission trial numbers 241n, wherein the trial numbers is set to "N," wherein N is a given natural number. Re-transmission of DHCP REQUEST packet may be conducted by counting trial numbers set for re-transmission as below.

At step S224, after each trial of re-transmission, the preset trial number is reduced by "1" by computing "Nf=Np−1," in which Np is a present trial number that the re-transmission has ended, and Nf is a next trial number that the re-transmission is to be conducted.

At step S225, it is checked whether the trial number becomes zero (Nf=0). If the Nf is not "0" at step S225 (NO at step S225), the DHCP REQUEST packet is re-transmitted because the re-transmission has not been conducted for a given trial number.

At step S226, the IP "identification" set in the identification generator 2473i in the PE 24 is updated to transmit a next DHCP REQUEST packet using the TCP/IP network.

At step S227, the second timer 2411t is initialized, and the process goes back to step S214 to re-activate the second timer 2411t, by which a transmission of DHCP REQUEST packet and detection of a response packet can be conducted again. When initializing the second timer 2411t at step S227, a time value can be changed from an original value based on a standard of RFC 2131. For example, a time value can be doubled from the original value (e.g., from 4 seconds to 8 seconds).

If Nf becomes zero at step S225 (YES at step S225), a new communication is need to be established because a detection of Nf=0 may indicate an error on communication status with a destination apparatus.

If the packet filter 23 cannot detect a response packet at step S225, the packet filter 23 may notify such situation as an apparatus-designated request to the PM 32. When the PM 32 receives such apparatus-designated request, the power-supply mode (or power-consumption mode) is shifted from the energy-saving mode to the normal mode at step S241. When the power-supply mode is shifted to the normal mode, the PE 24 notifies the "identification" used for the low-power mode and the transaction ID used for the low-power mode to the CPU 20, which is returned to an active condition due to the return to the normal mode.

At step S242, the PE 24 notifies the "identification" used for the low-power mode, and the transaction ID used for the low-power mode to the CPU 20, and the packet filter 23 notifies to the CPU 20 that no response packet was detected. After such notification, the control flow process ends.

A description is now given to a modified control flow process, which is changed from the process shown in FIG. 22. In the process of FIG. 22, if no DHCP ACK packet and DHCP NAK packet is detected (NO at step S222), and the second timer 2411t is out (YES at step S223), and the trial number does not reach a given number N set in advance (NO at step S225), a DHCP REQUEST packet is re-transmitted. When the DHCP REQUEST packet is re-transmitted, an IP "identification" set in the identification generator 2473i in the PE 24 is updated at step S226 for re-transmitting a packet on the TCP/IP network. However, the transaction ID set in the transaction ID generator 2473t of the PE 24 may not be updated.

If one DHCP REQUEST packet is transmitted using one transaction ID but the DHCP REQUEST packet cannot delivered to a destination apparatus due to some reasons (e.g., change or error of communication status), a next DHCP REQUEST packet may be transmitted using the same one transaction ID without problem for transmission. Such method can save resources for transaction ID because there is a limit for the numbers of transaction ID that can be generated.

However, due to some reasons, such communication between the DHCP Client (e.g., image forming apparatus) and DHCP Server may not be maintained: For example, the DHCP Server receives the first DHCP packet from the DHCP Client, and then processes the first DHCP packet in a proper manner and transmits the second DHCP packet to the network (first communication process); however, due to some reasons such as network error or the like, the DHCP Client cannot receive the second DHCP packet, and then the DHCP Client determines that the communication was not conducted successfully; then the DHCP Client re-transmits the first DHCP packet using the same transaction ID again to the DHCP Server so that a proper communication can be established; however, the DHCP Server has a recognition that the DHCP Server has already conducted a proper response in the first communication process, and ignores a new request communication re-transmitted from the DHCP Client; then the DHCP Client cannot use the IP address set in previous communication; then the DHCP Client needs to transmit another DHCP packet using a new transaction ID changed from the previous one.

Figure 23B:
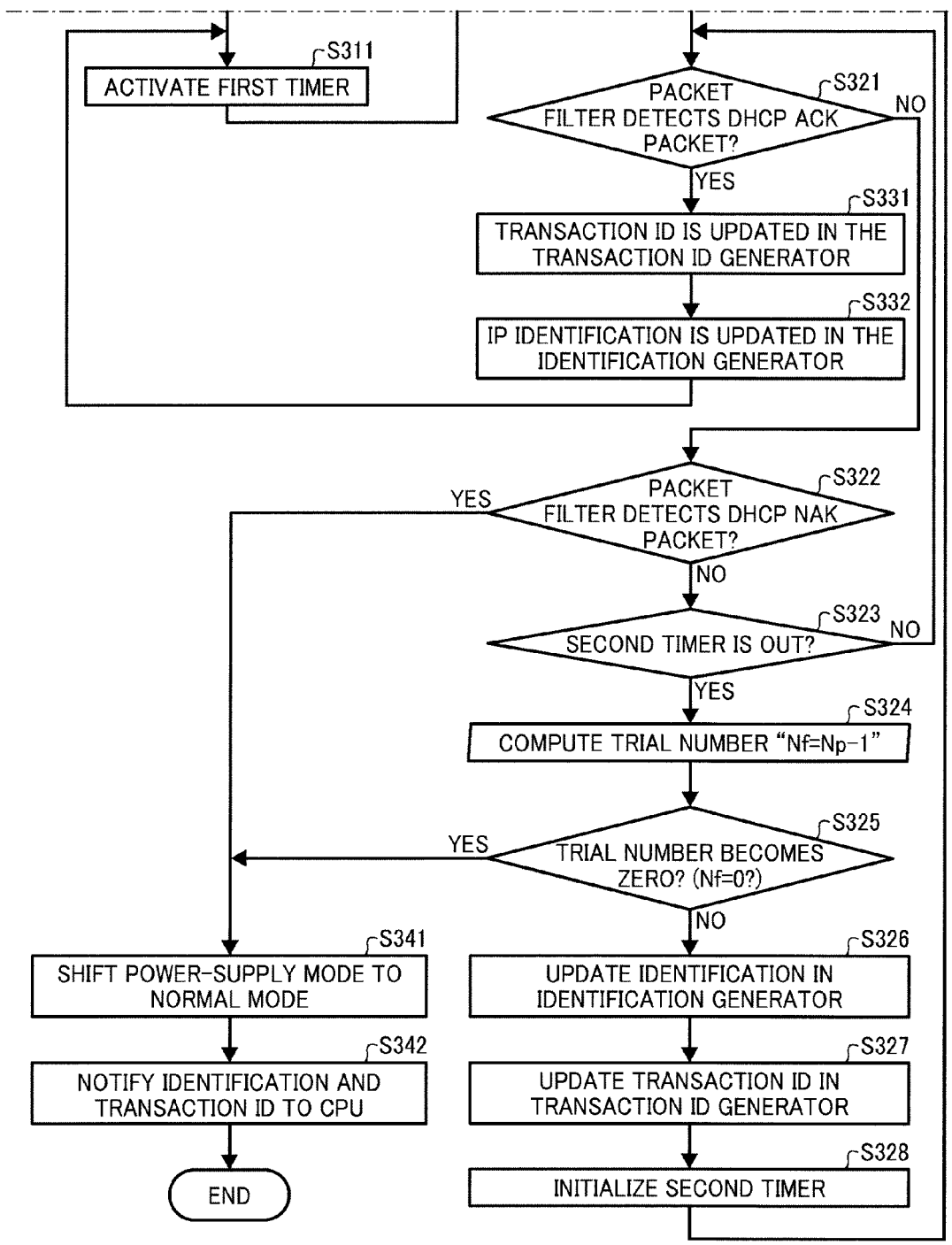

In light of such situation, in the modified control process shown in FIG. 23, a transaction ID set in the transaction ID generator 2473t of the PE 24 may be updated so that retransmission of DHCP REQUEST packet can be conducted effectively. FIG. 23 shows the modified control process.

In the control process of FIG. 23, step S327 is added to the control process of FIG. 22. At step S327, a transaction ID set in the transaction ID generator 2473t of the PE 24 is updated when to re-transmit a DHCP REQUEST packet. When no DHCP ACK packet and DHCP NAK packet is detected (NO at step S322), the second timer 2411t is out (YES at step S323), and the trial number does not reach a given number N set in advance (NO at step S325), a transaction ID is updated at step S327 so that the updated transaction ID can be used for a next DHCP REQUEST packet to be re-transmitted.

By adding step S327 as such, re-transmission of the DHCP REQUEST packet can be conducted under the low-power mode by updating the transaction ID. Accordingly, communication status using DHCP protocol can be kept under the lower-energy consumption even if some communication error may occur. Other than step S327, the control process of FIG. 23 and the control process of FIG. 22 include same process steps. Accordingly, detail of the control process of FIG. 23 is omitted.

In the control processes shown in FIGS. 22 and 23, an IP packet composed of identification data and message data can be transmitted, and then a response packet for such IP packet can be received under the energy-saving mode in which the CPU 20 is deactivated, which means such communication can be conducted under a reduced power consumption condition. Further, if a response packet cannot be received, a same packet can be re-transmitted under the energy-saving mode, which means such communication can be conducted under a reduced power consumption condition. Further, an identification data can be updated when a packet is to be re-transmitted or when a given packet (e.g., DHCP ACK) is received, which means TCP/IP communication can be conducted under the energy-saving mode. Further, communication using DHCP protocol can be conducted under the energy-saving mode. Further, because DHCP REQUEST packet and DHCP ACK packet can be communicated using DHCP protocol, a request of extension of communication of IP address can be conducted under the energy-saving mode.

Further, because a transaction ID of DHCP can be updated under the energy-saving mode (or lower power consumption), communication status using DHCP protocol can be kept under the energy-saving mode. Further, because the CPU 20 is notified an identification data used for the normal mode when the power-supply mode is shifted from the normal mode to the low-power mode, different identification data can be set for the normal mode and low-power mode, by which communication using TCP/IP protocol can be conducted for the low-power mode without confusion of identification data.

Further, because the CPU 20 is notified an identification data used for the lower-energy consumption when the power-supply mode is shifted from the lower-energy consumption to the normal mode, different identification data can be set for the normal mode and low-power mode, by which communication using TCP/IP protocol can be conducted for the normal mode without confusion of identification data.

Further, if a given packet (e.g., DHCP ACK) cannot be received, the power-supply mode (or power-consumption mode) can be shifted to the normal mode, and such no receiving status can be notified to the CPU 20. Accordingly, communication using DHCP protocol can re-started from DHCP Discover, by which an IP address can be received from the DHCP Server.

Further, communication using DHCP protocol can be conducted for an image forming apparatus and a request of extension of using same IP address can be conducted under the lower power consumption mode.

Packet Filter According to a Second Exemplary Embodiment

In the above described first exemplary embodiment, the PE 24 may transmit a DHCP REQUEST packet to the network using DHCP protocol automatically at a given time, which may be set as an given time interval, and the packet filter 23 may detect a response packet for the DHCP REQUEST.

A description is now given to a second exemplary embodiment of packet filter, in which the packet filter 23 may receive an incoming packet having a given frame structure under the energy-saving mode. If the incoming packet is for an apparatus-designated packet, a PE 24A (see FIG. 29) may generate an outgoing packet having a given frame structure in response to the incoming packet. The PE 24A, which receives a packet selected by the packet filter 23, generates an outgoing packet in response to the apparatus-designated request packet while the power-supply mode is in the energy-saving mode. Further, if the PE 24A cannot respond to an incoming packet under the energy-saving mode, the power-supply mode may be shifted to the normal mode from the energy-saving mode to activate the CPU 20.

Figure 24:
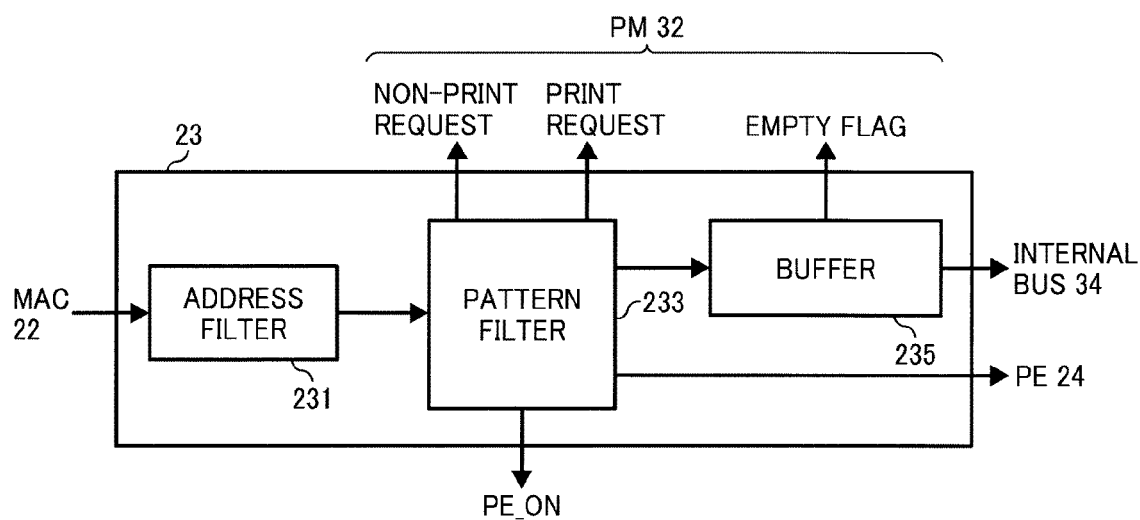
FIG. 24 shows a block diagram of a packet filter.

FIG. 24 shows a block diagram of the packet filter 23. The packet filter 23 shown in FIG. 24 may have a similar configuration of the packet filter 23 of FIG. 19. The packet filter 23 shown in FIG. 24 may include the address filter 231, the pattern filter 233, and the buffer 235 as similar to a configuration shown in FIG. 19. The address filter 231 can be registered with a unicast address and a multicast address. Further, an address can be set for the image forming apparatus itself and an accessible device (e.g., plotter 2) provided in the image forming apparatus.

The address filter 231 checks "type" of packet, input from the MAC 22, and determines types of packet based on the "type" information to check address information set in the packet to select which packet is let through the address filter 231 and then transmitted to the pattern filter 233, and which packet is not transmitted to the pattern filter 233 and destroyed. With such configuration, a packet that is accessible to an apparatus or device is only let through the address filter 231 and then transmitted to the pattern filter 233. Further, a broadcast packet can be let through the address filter 231 without no relevancy to a setting of the address filter 231, and then transmitted to the pattern filter 233.

A packet having the apparatus-designated address is a packet that can be let through the address filter 231. Accordingly, the apparatus-designated address may include a registered unicast address (e.g., IP address for the image forming apparatus or device in the image forming apparatus), a registered multicast address, and a broadcast address, for example.

The pattern filter 233 may include a masked area and a not-masked area to check whether an Ethernet packet can be let through the pattern filter 233, in which it is checked whether data in the Ethernet packet matches the not-masked area of set in the pattern filter 233. Because the masked area is assumed as matched condition without no relevancy to data in the packet, data set in the not-masked area may determine which packet can be let through the pattern filter 233. The data set in the not-masked area in the pattern filter 233 may be set for each one of bytes, and compared with data in the Ethernet packet, input to the pattern filter 233. A packet can be let through the pattern filter 233 only when the data set in the not-masked area matches the data in the packet.

The pattern filter 233 determines a filtering area using a pattern-filter length obtained by adding a data length of masked area and a data length of not-masked area. For example, the pattern-filter length may be set to a length of 64 bytes.

Further, the pattern filter 233 may use a pattern offset to set a certain length for pattern filter to a concerned data area. The pattern offset may include a pattern offset 1 and a pattern offset 2, which may be controlled by offset values. The pattern offset 1 may be an offset length set for Ethernet frame, which is a length from a start of Ethernet frame. When the pattern filter 233 starts a filtering process from "type" for Ethernet frame, the pattern offset 1 may have a length, which is a sum of a destination MAC address length and a source MAC address length. Further, the pattern offset 2 may have an offset length that a filtering can start from a beginning of the pattern filter 233. A one (1) byte from a pattern offset can be filtered for each of bits by setting a bitmask value for each bit. A bit corresponding to a bitmask value of "1" is a masked area.

In a second exemplary embodiment, if a print request is requested to the image forming apparatus, the image forming apparatus cannot conduct the print request under the energy-saving mode. Accordingly, if the print request is received and to be conducted, the power-supply mode may need to be shifted from the energy-saving mode to the normal mode. Accordingly, under the energy-saving mode, the PE 24A can respond to a no-print request, which may not request a print operation.

The pattern filter 233 determines whether a packet received from the address filter 231 is a packet for no-print request (hereinafter, no-print request packet) or a packet for print request (hereinafter, print request packet). If the received packet is determined as the no-print request packet, such status is notified to the PM 32; if the received packet is determined as the print request packet, such status is notified to the PM 32, and then the print request packet, which is filtered by the pattern filter 233, is output to the buffer 235.

Further, if the pattern filter 233 receives an ARP (address resolution protocol) request packet from the address filter 231, the pattern filter 233 transmits a PE_ON signal to the SEL 25, and outputs the ARP request packet to the PE 24.

A description is now given to a filtering process for no-print request, which can be responded by the PE 24 under the energy-saving mode, in which different types of packet are used.

TCP Packet

Figure 25:
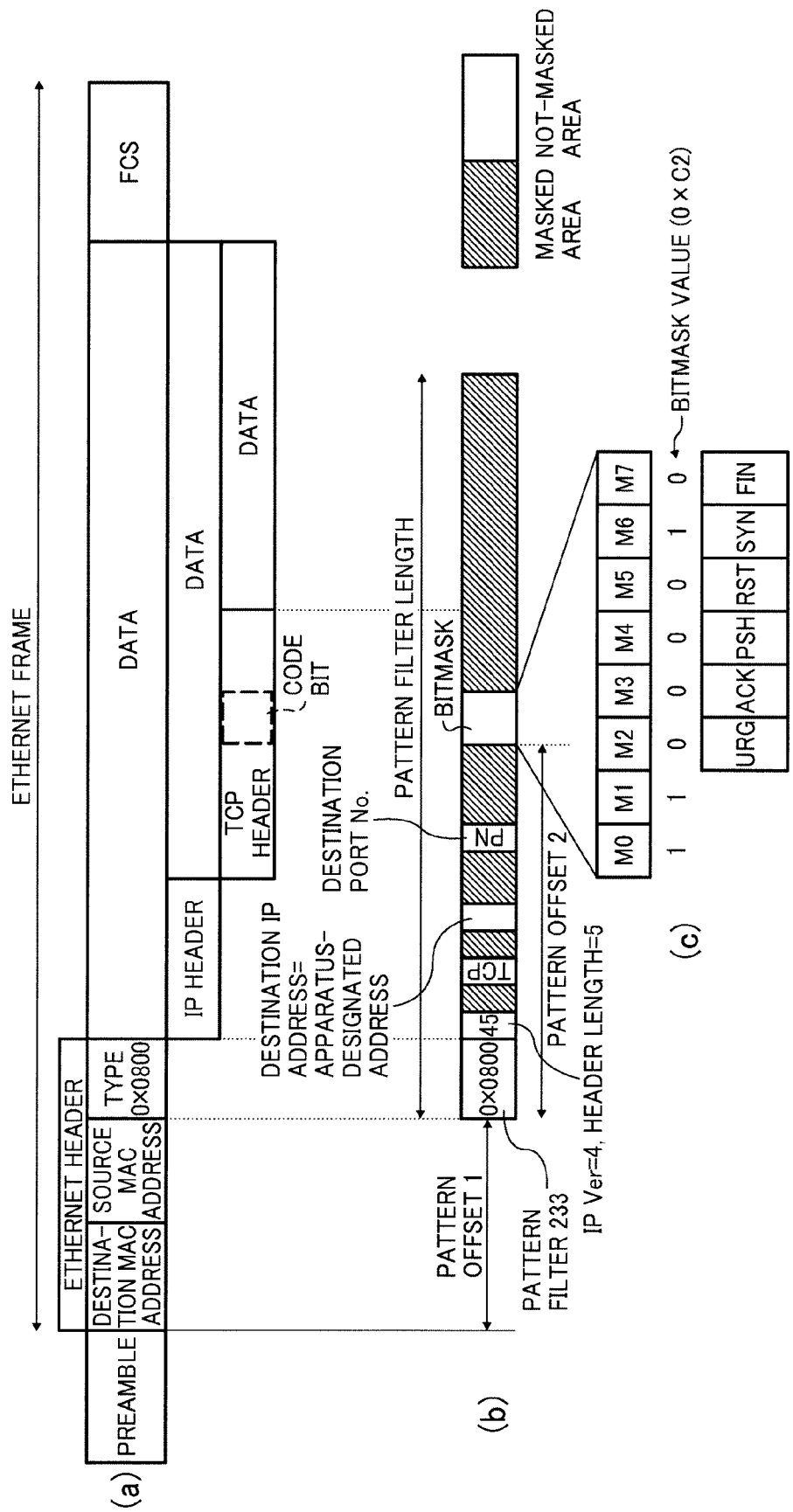
FIG. 25 shows a filtering process for TCP packet in the packet filter of FIG. 24.

FIG. 25 shows a filtering process for TCP packet using the packet filter 23. FIG. 25(a) shows an example format of a network frame of TCP packet (see FIG. 12). FIG. 25(b) shows a filtering processing condition set to the pattern filter 233 in the packet filter 23 having a masked area and a not-masked area, in which data for the not-masked area is to be processed.

As shown in FIG. 25(b), as for a filtering process condition of the TCP packet, the pattern filter 233 in the packet filter 23 may be set with a pattern offset 1, wherein the pattern offset 1 is a sum of the destination MAC address length and the source MAC address length. Further, because the first 16 bits of TCP packet is referred to as "type," the first 16 bits of the pattern filter 233 may be set as a not-masked area. As for the TCP packet, the first 16 bits of the pattern filter 233 is set with "0x0800" which indicates a "type" of IP protocol, for example.

Further, a comparison value is set to the pattern filter 233 with respect to an IP header of TCP packet. For example, in the pattern filter 233, the version (Ver) is set to "4" for IPv4; header length is set to "5"; the protocol number is set to a TCP protocol number; the destination IP address is set to an IP address (or apparatus-designated address) of the image forming apparatus, respectively, and other portion of IP header is set as a masked area (see shaded area in FIG. 25(b)). Further, as for TCP header of TCP packet, a comparison value is set for a port number of application for a destination port number, and comparison value is set for a code bit.

Then, the pattern filter 233 may be set with values for checking the TCP packet. Specifically, a SYN bit of "1," which is a connection establishment request, may be set to the pattern filter 233 so that the TCP packet can be let through the pattern filter 233. For example, in the TCP packet, a code bit may come at a 14th-byte from a head of TCP header. Accordingly, the pattern offset 2 may be set with a data length of 13 bytes in the pattern filter 233 as shown in FIG. 25(b). When "0x02" is set to the 14th-byte of the pattern filter 233, "0x02" can be compared with SYN (connection request) in the code bit of the TCP packet shown in FIG. 25C. Further, when a bitmask value is set to "0xC2", a TCP packet having the code bit SYN set to 1 can be let through the pattern filter 233.

A portion of the pattern filter 233, corresponding to other portion in the header area of the TCP packet is set as a masked area (shaded portion in FIG. 25(b)). Further, a portion of the pattern filter 233, which comes after the bitmask is also set as a masked area (shaded portion in FIG. 25(b)). Further, the destination port number of the TCP header may be set to "80" when http (hypertext transfer protocol) is used for application, or set to "515" when a print protocol is LPD protocol. When a filtering process is conducted for bit other than SYN, a bitmask value may be changed. For example, when a filtering process is conducted for ACK, a bitmask value may be changed to "0xD0."

As such, the pattern filter 233 can conduct a filtering process for a given request packet, which is a no-print request, that can be responded by the PE 24A, wherein such request packet may have the code bit of SYN (connection request) as a condition for letting through the pattern filter 233. Further, when a packet matching to a let-through condition is input, a PE_ON signal is activated and transmitted to the SEL 25 from the pattern filter 233, and the pattern filter 233 lets through and outputs a packet to the PE 24A.

Further, if the destination port number of the TCP header may be set to "515" for the pattern filter 233, which is a print protocol of LPD application, and when the pattern filter 233a receives a TCP packet corresponding to the print protocol, a print request signal is activated, and notified to the PM 32.

UDP Packet

Figure 26:
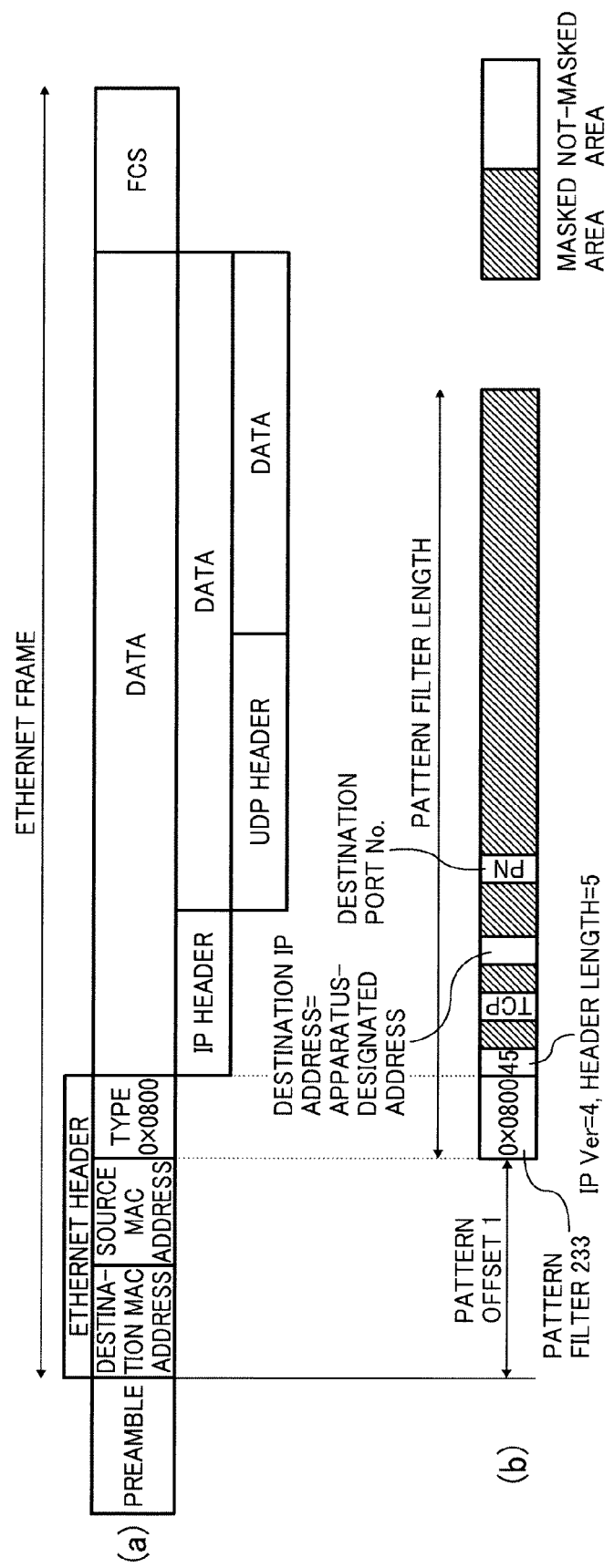
FIG. 26 shows a filtering process for UDP packet in the packet filter of FIG. 24.

FIG. 26 shows a filtering process for UDP packet using the packet filter 23. FIG. 26(a) shows an example format of a network frame of UDP packet (see FIG. 9). FIG. 26(b) shows a filtering processing condition set to the pattern filter 233 in the packet filter 23 having a masked area and a not-masked area, in which data for the not-masked area is to be processed.

As shown in FIG. 26(b), as for filtering process condition of the UDP packet, the pattern filter 233 in the packet filter 23 may be set with the pattern offset 1, wherein the pattern offset 1 is a sum of the destination MAC address length and the source MAC address length. Further, because the first 16 bits of TCP packet is referred to as "type," the first 16 bits of the pattern filter 233 may be set as a not-masked area. As for the UDP packet, the first 16 bits of the pattern filter 233 is set with "0x0800" which indicates a "type" of IP protocol, for example.

Further, a comparison value is set to the pattern filter 233 with respect to an IP header of TCP packet. For example, in the pattern filter 233, the version (Ver) is set to "4" for IPv4; header length is set to "5"; the protocol number is set to a UDP protocol number; the destination IP address is set to an IP address (or apparatus-designated address) of the image forming apparatus, respectively, and other portion of IP header is set as a masked area (see shaded area in FIG. 26(*b*)). Further, as for UDP header, a comparison value is set for the pattern filter 233. For example, a destination port number for UDP is set with a port number of an application to be used, and other portion of UDP header are set as a masked area (see shaded portion in FIG. 26(*b*)).

Further, a portion after UDP header may be set as a masked area (see shaded portion in FIG. 26(*b*)).

When the network attempts to access MIB (management information base) information, which is used to inform status of the image forming apparatus to an external environment, a response packet may need to use SNMP (simple network management protocol) protocol, http (hypertext transfer protocol), or the like as described later with the PE 24A. The SNMP and http can use UDP protocol, for example.

If a destination port number of the UDP header in the pattern filter 233 is set with a port number for an application, which may request an access to MIB information, a request packet from the application the can be filtered by the pattern filter 233. As such, the pattern filter 233 may use a port number of application, which may request an access to the MIB information, as a let-through condition of the pattern filter 233.

As such, the pattern filter 233 can conduct a filtering process for a given request packet, which is a no-print request, that can be responded by the PE 24A. Further, when a packet matched to a filtering or let-through condition of the pattern filter 233 is input, a PE_ON signal is activated and transmitted to the SEL 25 from the pattern filter 233, and the pattern filter 233 lets through and outputs a packet to the PE 24A.

ARP Packet

Figure 27:
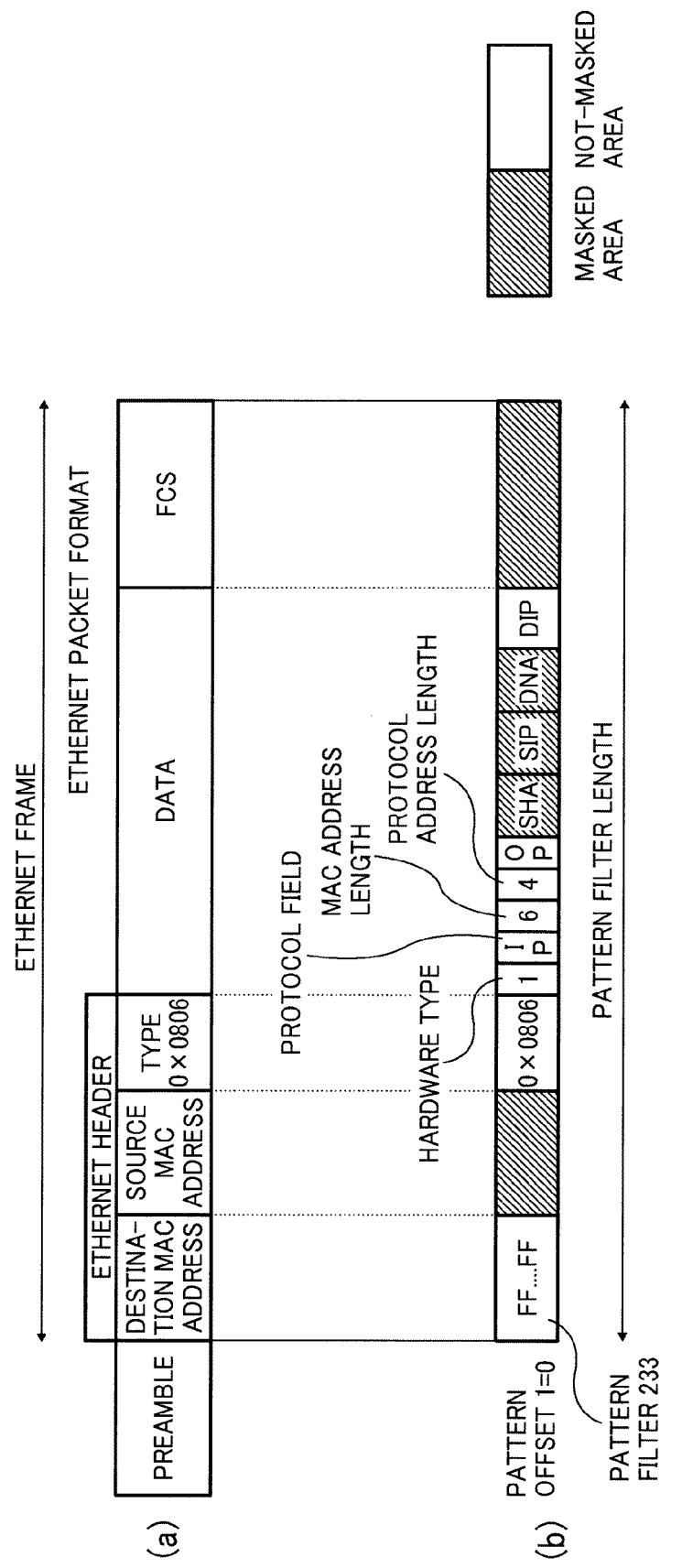
FIG. 27 shows a filtering process for ARP packet in the packet filter of FIG. 24.

FIG. 27 shows a filtering process for ARP packet using the packet filter 23. FIG. 27(*a*) shows an example format of a network frame of ARP packet (see FIG. 16). FIG. 27(*b*) shows a filtering processing condition set to the pattern filter 233 in the packet filter 23 having a masked area and a not-masked area, in which data for the not-masked area is to be processed.

As shown in FIG. 27(*b*), as for a filtering process condition of the ARP packet, the pattern filter 233 in the packet filter 23 may be set with a pattern offset 1 having a length of "0" as shown in FIG. 27(*b*) so that the pattern filter 233 can be compared with the ARP packet frame from a beginning of the ARP packet frame.

Because a destination MAC address, set at a head of Ethernet header is referred with the ARP packet, a portion in the pattern filter 233 corresponding to the destination MAC address is set as a not-masked area. Because the ARP protocol is a broadcast, all bits for the ARP packet in the pattern filter 233, corresponding to the destination MAC address, are set to "1." Further, a portion in the pattern filter 233 corresponding to the source MAC address of Ethernet header is set as a masked area (see shaded portion in FIG. 27(*b*)).

Further, because "type" of the Ethernet header is set to "0x0806" which corresponds to an ARP protocol, the pattern filter 233 is set with a comparison value, which is compared with "type" of the ARP packet. Then, in the pattern filter 233, the hardware "type" is set to "1", the protocol field is set to "IP", the MAC address length is set to "6", the protocol address length is set to "4" because IPv4 is used, and the operation code is set to "1 (or OP)" to indicate an ARP request. Then, in the pattern filter 233, the source hardware address (SHA), the source IP address (SIP), the destination hardware address (DHA) are set as a masked area (see shaded portion in FIG. 27(*b*)). The destination IP address (DIP) is set with an IP address of the image forming apparatus, and other portion of the pattern filter 233 set as a masked area (see shaded portion in FIG. 27(*b*)).

The pattern filter 233 receives a given packet under such settings, and conducts a filtering process, by which an ARP request packet, which is broadcasted, can be let through the pattern filter 233.

If the pattern filter 233 is set with a destination port number "80" used for an application using http protocol, and SNMP protocol, which are no-print protocol, and an ARP request packet corresponding to such protocol is received by the pattern filter 233, a no-print request signal is set to an active condition, and such condition is notified to the PM 32.

If the pattern filter 233 is set with a filtering condition for ARP packet, the pattern filter 233 transmits an active PE_ON signal to the SEL 25 when the pattern filter 233 receives an ARP request packet, and passes through and outputs the packet to the PE 24A.

ICMP Packet

Figure 28:
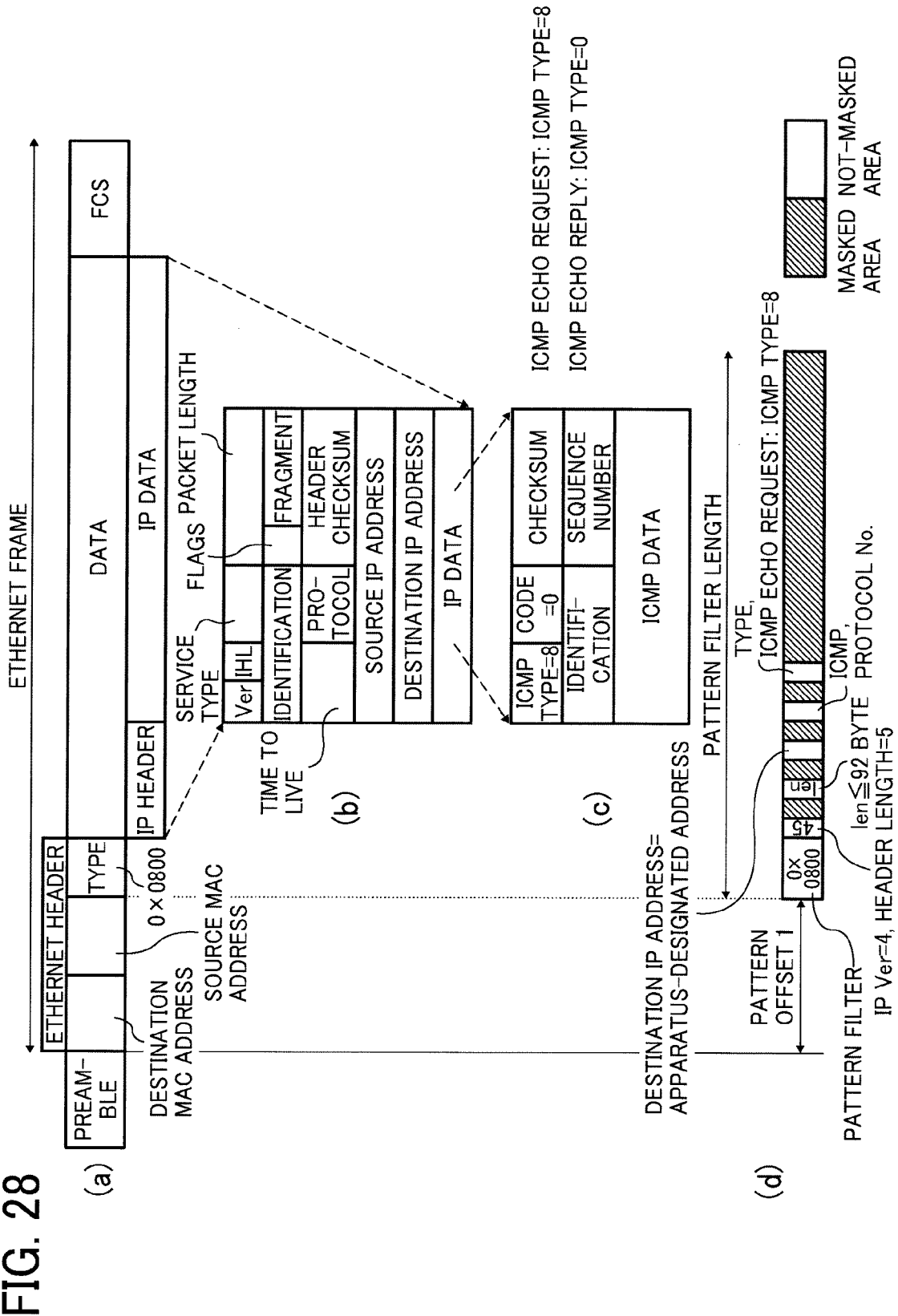
FIG. 28 shows a filtering process for ICMP packet in the packet filter of FIG. 24.

FIG. 28 shows a filtering process for ICMP packet using the packet filter 23. FIG. 28(*a*) shows an example format of a network frame of ICMP packet (see FIG. 14). FIGS. 28(*b*) and 28(*c*) show data type for each field in the ICMP packet. FIG. 28(*d*) shows a filtering processing condition set to the pattern filter 233 in the packet filter 23 having a masked area and a not-masked area, in which data for the not-masked area is to be processed. Further, FIGS. 28(*b*) and 28(*c*) show data of the ICMP echo-request packet.

As shown in FIG. 28(*d*), as for a filtering process condition of the ICMP packet, the pattern filter 233 in the packet filter 23 may be set with a pattern offset 1, wherein the pattern offset 1 is a sum of the destination MAC address length and the source MAC address length. Further, because the first 16 bits of TCP packet is referred to as "type," the first 16 bits of the pattern filter 233 may be set as a not-masked area. As for the TCP packet, the first 16 bits of the pattern filter 233 is set with "0x0800" which indicates a "type" of IP protocol, for example.

Further, as shown in FIG. 28(*b*), in the pattern filter 233, the version (Ver) is set to "4" for IPv4; header length is set to "5"; the protocol number is set to a ICMP protocol number; the destination IP address is set to an IP address (or apparatus-designated address) of the image forming apparatus; the "type" of ICMP is set to "8" indicating ICMP echo-request packet; and other portion of IP header is set as a masked area (see shaded area in FIG. 28(*d*)). Further, in the pattern filter 233, a comparison value for a packet length of IP header may be set to 92 bytes or less in the "len," wherein 92 bytes may be used when ICMP packet has a data size of 64 bytes and IP header has a length of 20 bytes.

As such, the pattern filter 233 may be set with a given filtering condition to conduct a filtering process for a packet transmitted from the network. If such packet is determined as an ICMP echo-request packet having a data length of 64 byte and matches the filtering processing condition, the pattern filter 233 may transmit an active PE_ON signal to the SEL 25, and let-through and output the packet to the PE 24A. A PING response of the PE 24 will be described later.

Further, if the ICMP packet has a data size of more than 64 bytes, the packet filter 23 notifies that the packet filter 23 receives a no-print request packet to the PM 32, and stores the ICMP packet to the buffer 235. In this case, the ICMP packet may be processed under the modified energy-saving mode. Further, because the ICMP packet typically has a data size of 64 bytes, a hardware configuration can be designed simpler.

For example, a circuit, which a PING packet can be recognized only when the ICMP packet is 64 bytes, can be designed because such configuration may not cause problem for actual apparatus.

A description is now given to when a destination IP address is registered to the address filter 231 as a multicast address. In case of the registered multicast address, the number of filters may be matched to the number of registered multicast address, and the destination IP address may be set with the registered multicast address. Further, other than a setting of destination IP address, similar settings can be used conducted as similar to the above-described packets.

Packet Engine Unit According to a Second Exemplary Embodiment

A description is now given to the PE 24A according to a second exemplary embodiment. The PE 24A may include a packet generator which can generate a response packet in response to a packet that the image forming apparatus receives from the network and filtered by the packet filter 23 according to a second exemplary embodiment. The PE 24A may generate a UDP packet, an ARP packet using SSDP (simple service discovery protocol) when a given packet (e.g, MIB request packet) is received by the packet filter 23. A description is now given to a configuration and an operation of the PE 24A.

In a second exemplary embodiment, while the power-supply mode is kept at the energy-saving mode, the PE 24A generates a reply packet, which responds to a request received from the network. Further, the PE 24A can generate a UDP packet. Further, if the pattern filter 233 receives a packet that cannot be responded by the PE 24 under the energy-saving mode, the power-supply mode may be shifted from the energy-saving mode to another mode so that the CPU 20 can be activated.

Figure 29:
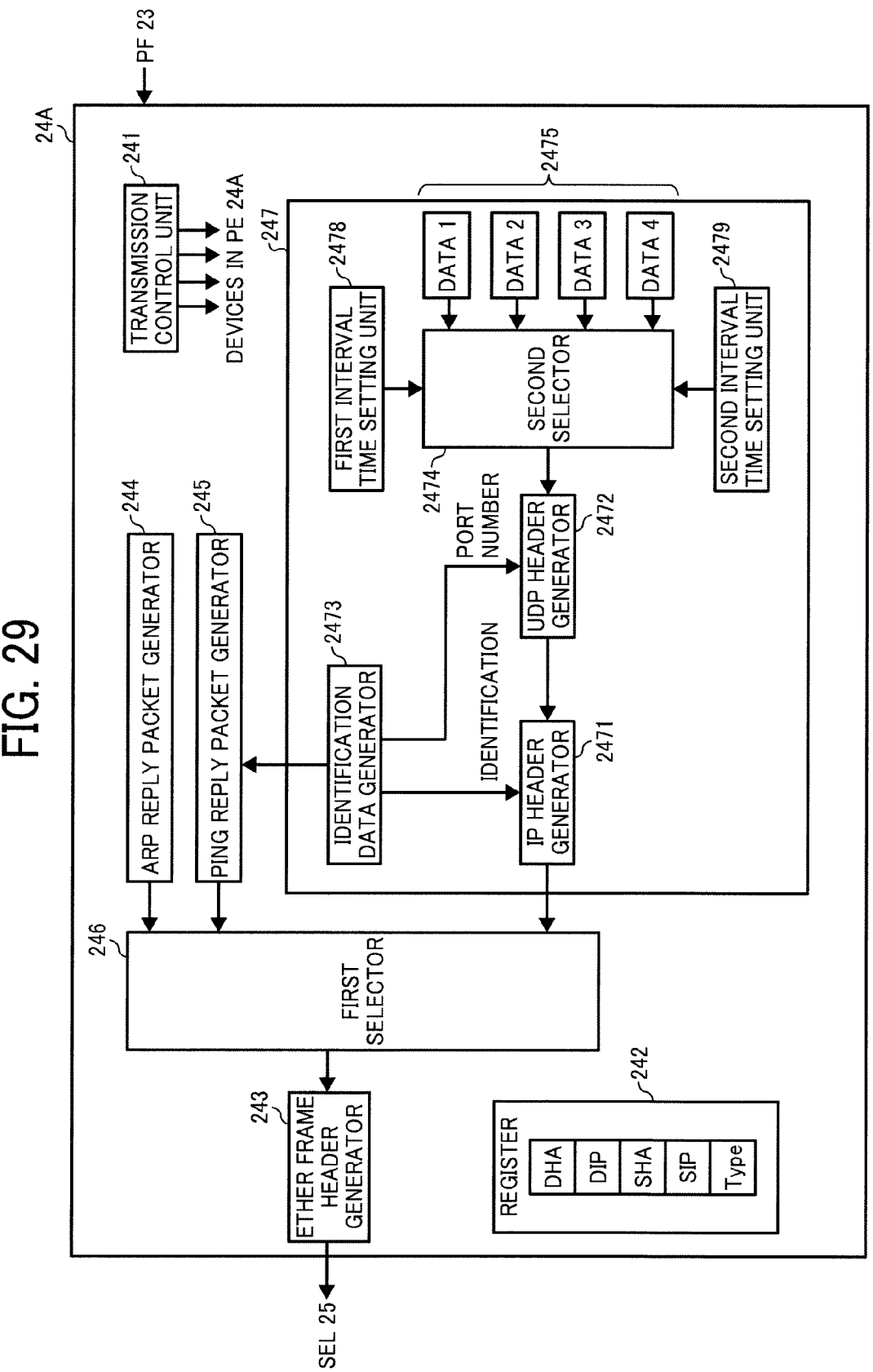
FIG. 29 shows a block diagram of packet engine unit.

FIG. 29 shows a block diagram of the PE 24A. The PE 24A has a similar configuration of the PE 24 of FIG. 18. The PE 24A may include the transmission control unit 241, the register 242, the Ether frame header generator 243, an ARP reply packet generator 244, a PING reply packet generator 245, the IP packet generator 247, a first selector 246, for example. The first selector 246 selects any one of outputs from the ARP reply packet generator 244, the PING reply packet generator 245, and the IP packet generator 247. The transmission control unit 241 may control the register 242, the Ether frame header generator 243, the ARP reply packet generator 244, the PING reply packet generator 245, the IP packet generator 247, and the first selector 246, for example.

A description is now given to a configuration and response operation for the ARP reply packet generator 244, the PING reply packet generator 245, and the IP packet generator 247 included in the PE 24A, wherein the PE 24A can respond a given packet of no-print request selected by the packet filter 23.

ARP Response

With reference to FIG. 29, an ARP response conducted by the ARP reply packet generator 244 is explained. The "ARP" is a protocol for recognizing a MAC address for a counterpart communication-apparatus designated by an IP address. Specifically, an ARP request is transmitted to a to-be-checked apparatus, and then receive an ARP reply from the to-be-checked apparatus.

The PE 24A receives an ARP request packet filtered by the packet filter 23, generates and transmits an ARP reply packet to a network as a response to the ARP request packet. When such ARP response is conducted, the first selector 246 may select an output of the ARP reply packet generator 244.

Figure 30:
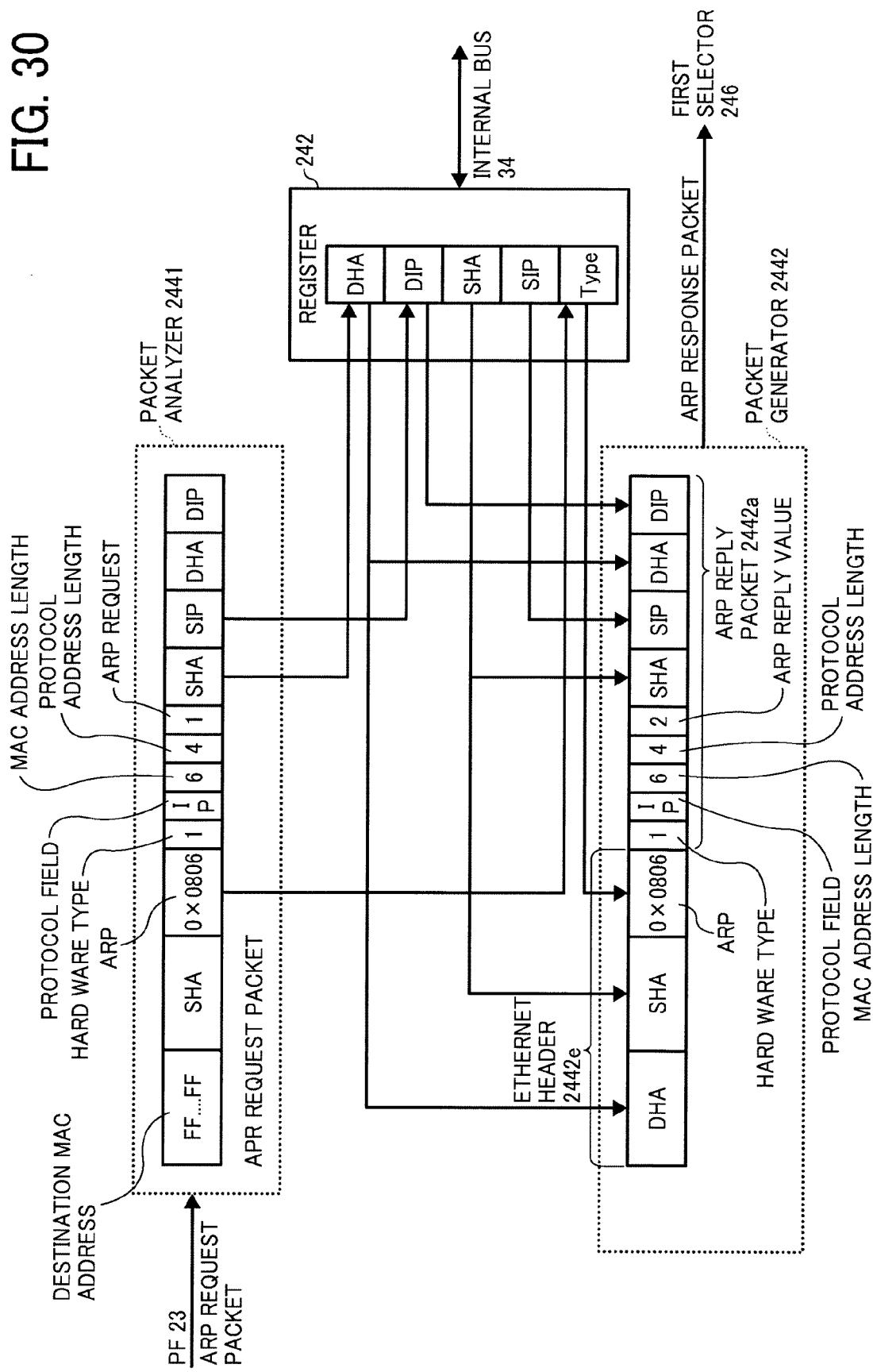
FIG. 30 shows an ARP reply packet generator in the packet engine unit of FIG. 29.

FIG. 30 shows the ARP reply packet generator 244 provided in the PE 24A. The ARP reply packet generator 244 may include a packet analyzer 2441, a packet generator 2442, and a register 242, for example. The register 242 may be used as a common device for the PING reply packet generator 245 to be described later. The packet analyzer 2441 receives an ARP request packet from the packet filter 23. As shown in FIG. 30, the ARP request packet may include a destination MAC address field, SHA (source hardware address), ARP, a "hardware type" field, a protocol field, a MAC address length ("HLEN") field, a protocol address length ("PLEN") field, an ARP request field, SHA, SIP (source IP address), DHA (destination hardware address), and DIP (destination IP address), for example.

The packet analyzer 2441 analyzes values of the SHA field and SIP field in the ARP request packet, and sets the SHA of ARP request packet to the DHA of register 242, and sets the SIP of ARP request packet to the DIP of register 242. Further, a hardware address of the image forming apparatus is set to the SHA of register 242, and an IP address of the image forming apparatus is set to the SIP of register 242. Such setting to the SHA and SIP of register 242 can be conducted by the CPU 20, which means such setting cannot be conducted during the energy-saving mode. Accordingly, such setting to the SHA and SIP of register 242 may be conducted when the CPU 20 is activated.

The packet generator 2442 generates an ARP response packet, which may include an Ethernet header 2442e and an ARP reply packet 2442a as shown in FIG. 30. The Ethernet header 2442e may be configured with fields of DHA, SHA, and type, and a value read from the DHA of register 242 may be set to DHA of the Ethernet header 2442e, and a value read from the SHA of register 242 may be set to the SHA of Ethernet header. Further, "type" field may be set to "0x0806" for indicating the ARP packet. Further, the ARP reply packet 2442a may be set to a data portion of Ethernet frame.

In the ARP reply packet 2442a, the "hardware type" field of the may be set to "1" for Ethernet; the protocol field may be set to "0x0806" when TCP/IP is used; the MAC Address length ("HLEN") field may be set to "6"; and the protocol address length ("PLEN") field may be set to "4" when IPv4 is used. Further, the OP field may be set to "2" for indicating ARP reply. Further, in the ARP reply packet 2442a, the SHA field may be set to a value of the SHA of register 242; the SIP field may be set to a value of the SIP of register 242; the DHA field may be set to a value of the DHA of register 242; and the DIP field may be set to a value of the DIP of register 242.

Because the MAC 22 can automatically generate the FCS of the Ethernet frame, the packet generator 2442 may not need to generate the FCS of the Ethernet frame.

When the ARP response packet generated by the packet generator 2442 is transmitted to the network, the packet filter 23 outputs an active PE_ON signal, and the SEL 25 transmits the ARP response packet, output from the PE 24A, to the MAC 22. Further, when the PE_ON signal is in a non-active status, data may be input to the MAC 22 from the internal bus 34.

As such, the packet generator 2442 can generate an ARP response packet having a given frame structure in response to a ARP request packet transmitted to the image forming apparatus from a source apparatus without using the CPU 20 and the memory 11, and the ARP response packet which can be received by the source apparatus can be transmitted to the network. The generated ARP response packet may be transmitted to the network via the SEL 25, the MAC 22, and the PHY 12.

PING Response

A description is now given to a PING response conducted by the PING reply packet generator 245 shown in FIG. 29. A PING process is a diagnosis program to diagnose the network based on data, which can be obtained by transmitting an ICMP echo-request packet to a to-be-checked apparatus using ICMP protocol. Data used for such diagnosis may be a reception of reply (or a non-reception of reply), a time required for responding an ICMP echo-request sent from a given apparatus.

Figure 31:
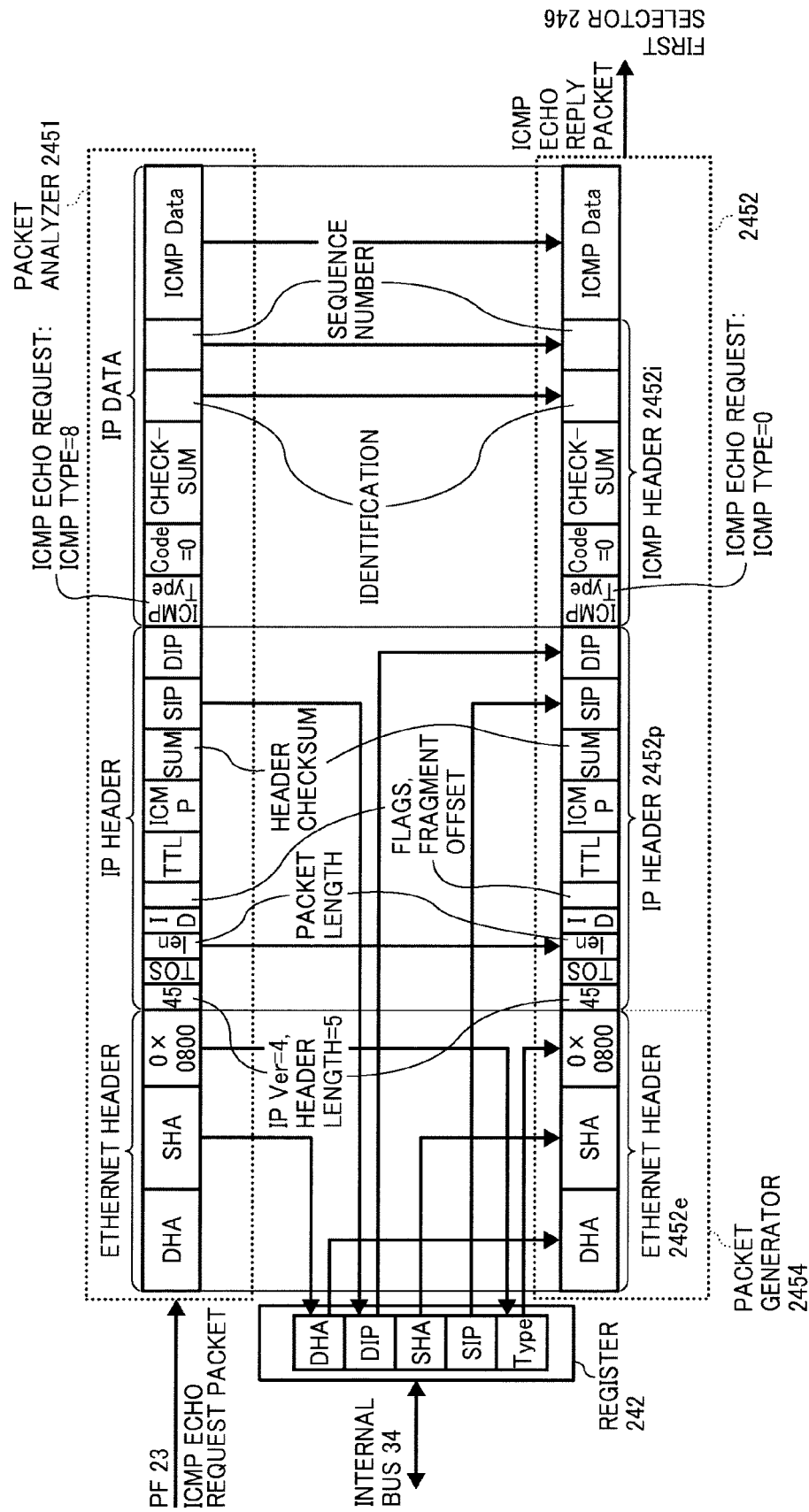
FIG. 31 shows a PING reply packet generator in the packet engine unit of FIG. 29.

The PE 24A may receive an ICMP echo-request packet filtered by the packet filter 23, generate a PING reply packet, and transmit the PING reply packet to the network as a PING response packet. During such PING response process, the first selector 246 selects an output of the PING reply packet generator 245. FIG. 31 shows the PING reply packet generator 245 provided in the PE 24A. The PING reply packet generator 245 may include a packet analyzer 2451, a packet generator 2452, and the register 242, for example. The register 242 may be used as a common device for the ARP reply packet generator 244.

The packet analyzer 2451 may receive an ICMP echo-request packet from the packet filter 23. As shown in FIG. 31, the ICMP echo-request packet may include a destination MAC address, SHA (source hardware address), a protocol "type", a version/header length, "Type of Service", a packet length, "identification", flag/fragment offset, TTL (Time to Live), a protocol number, header checksum, SIP (source IP address), a destination IP address (DIP), message type, code field, checksum, "identification," sequence number, and ICMP data, for example.

The packet analyzer 2451 analyzes a value of SHA of Ethernet header and a value of SIP of IP header in ICMP echo-request packet. Then, the destination hardware address (DHA) of register 242 may be set with the "SHA" of Ethernet header, and the destination IP address (DIP) of register 242 may be set with the "SIP" of IP header. The "message type" of IP data may store "8" for indicating the ICMP echo-request packet.

Further, the SHA of register 242 may be set with a hardware address of the image forming apparatus, and the SIP of register 242 may be set with an IP address of the image forming apparatus. Such setting to the SHA and SIP of register 242 can be conducted by the CPU 20, which means such setting cannot be conducted during the energy-saving mode. Accordingly, such setting to the SHA and SIP of register 242 may be conducted when the CPU 20 is activated.

The packet generator 2452 generates an ICMP echo-reply packet configured with an Ethernet header 2452e, an IP header 2452p, and IP data. In the Ethernet header 2452e, the DHA field may be set with the DHA of register 242, and the SHA field may be set with the SHA of register 242. Further, "0x800" indicating IP of "protocol type" field for the ICMP echo-request packet is copied to a "protocol type" field of the Ethernet header 2452e.

The IP header 2452p of the packet generator 2452 may be generated for the ICMP echo-reply packet as below. In the IP header 2452p, version/header length, "Type of Service", a packet data length, "identification", flag/fragment offset, protocol number of the packet analyzer 2451 are respectively copied to corresponding fields in the ICMP echo-reply packet. Further, the TTL field may be set to "255." Further, after such copying, a checksum is computed, and set such value to a checksum field of the ICMP echo-reply packet. The checksum can be computed by a known compliment computing method. Further, the SIP field of IP header 2452p may be set with the SIP data in register 242, and the DIP field of IP header 2452p in the ICMP echo-reply packet may be set with the DIP data in register 242.

Then, IP data for the ICMP echo-reply packet is generated in the packet generator 2452, wherein the IP data may include an ICMP header 2452i and ICMP data portion, for example. In the ICMP header 2452i, the "message type" field may be set with "0" for indicating the ICMP echo-reply packet. Further, the "code field" may be set with "0", and then a checksum is computed and set to a checksum field (Checksum field). The checksum can be computed by a known compliment computing method.

Further, data of the IP data identification field of the ICMP echo-request packet in the packet analyzer 2451 may be copied to an identification field of the ICMP header 2452i in the packet generator 2452. Similarly, data of sequence number field may be copied from the packet analyzer 2451 to the packet generator 2452.

As such, the packet generator 2452 can generate an ICMP echo-reply packet having a given frame structure in response to an ICMP echo request packet transmitted to the image forming apparatus from a source apparatus without using the CPU 20 and the memory 11, and the ICMP echo-reply packet which can be received by the source apparatus can be transmitted to the network. The generated ICMP echo-reply packet may be transmitted to the network via the SEL 25, the MAC 22 and the PHY 12.

UDP Response

A description is now given to an UDP response conducted by the IP packet generator 247 with reference to FIG. 29. A format of UDP packet used for UDP response is shown in FIG. 3. In the UDP response, a UDP request may be transmitted from the network, and then MIB information is transmitted to the network using UDP data. The MIB information may be accessible using a protocol such as SNMP and http protocol using UDP protocol, for example. When the PE 24A receives a UDP request packet, which request an access to MIB information and filtered by the packet filter 23, the PE 24A may generate a UDP packet having UDP data as a response to the network.

During such UDP response, the first selector 246 selects an output of the IP packet generator 247. To avoid contention among outputs of the IP packet generator 247, the ARP reply packet generator 244, and the PING reply packet generator 245, the transmission control unit 241 may output a plurality of outputs, generated by each of packet generators, by setting a given order in advance, when an output timing from a plurality of packet generators are overlapped. The order may be from the output of the ARP reply packet generator 244, the output of the PING reply packet generator 245, and then the output of the IP packet generator 247, for example.

As shown in FIG. 29, the IP packet generator 247 of the PE 24A may include an IP header generator 2471, an UDP header generator 2472, the identification data generator 2473, a second selector 2474, a data storage 2475, a first interval-time setting unit 2478, and a second interval-time setting unit 2479, for example. The data storage 2475 may store a plurality of data such as data 1, data 2, data 3, and data 4, wherein each data can be accessed independently. An output of the IP packet generator 247 is input to the first selector 246, and then transmitted to the network as UDP response when the UDP response is conducted.

The data storage 2475 stores the data 1, data 2, data 3, and data 4 as UDP data to be used for a UDP response packet, wherein such UDP data may be transmitted in response to a no-print request packet. For example, data may be transmitted in response to a no-print request packet defined by a UDP request packet using the above-described SNMP or http protocol. Such no-print request packet may be used to access MIB information. The SNMP may be defined by RFC 1155, RFC 1157, and RFC 1213, and the MIB may be defined by RFC 1213.

The CPU 20 may be used to store such data in the data storage 2475, which may be used for MIB transmission in response to a no-print request packet. Accordingly, such setting cannot be conducted during the energy-saving mode. Accordingly, such setting can be conducted when the CPU 20 is activated before the power-supply mode is shifted to the energy-saving mode. If the setting is updated and stored in the data storage 2475 in advance, such updated information, set in the normal mode, can be accessed during the energy-saving mode, by which latest data can be prepared.

Further, UDP can be used for transmitting packet when SSDP (simple service discovery protocol) is used. The SSDP is a protocol to detect an apparatus linked to the network, and apparatus information may be transmitted using a UDP packet. The apparatus information may be prepared and stored in the data storage 2475. Such setting can be conducted when the CPU 20 is activated before the power-supply mode is shifted to the energy-saving mode. If the setting is updated and stored in the data storage 2475 in advance, such updated information, set in the normal mode, can be accessed during the energy-saving mode, by which latest data can be prepared.

In an second exemplary embodiment, the second selector 2474 can select a plurality of response data stored in the data storage 2475 one by one with a given order, and can transmit such data as UDP data repeatedly using a given process procedure.

The response data (e.g., data 1, data 2, data 3, and data 4) can be selected by the second selector 2474 at a given timing set by the first interval-time setting unit 2478 and the second interval-time setting unit 2479. Specifically, a time interval for selecting data (e.g., data 1, data 2, data 3, and data 4) in one cycle, and a time interval for repeating a plurality of cycles can be set by the first interval-time setting unit 2478 and the second interval-time setting unit 2479.

In an second exemplary embodiment, the response data (e.g., data 1, data 2, data 3, and data 4) may be selected in this order as one cycle by setting a first interval time used for selecting data one by one in one cycle. The first interval-time setting unit 2478 may generate and set the first interval time (for selecting data), and then the data 1, data 2, data 3, and data 4 can be selected in this order in one cycle (hereinafter, first cycle) with the first interval time.

After conducting such first cycle, the response data (e.g., data 1, data 2, data 3, and data 4) may be selected again using a same cycle (hereinafter, second cycle) by setting a second interval time between the end of first cycle and the start of the second cycle. Specifically, after selecting the data 4 in the first cycle, the second interval time has been passed, then the second cycle starts by selecting the data 1 again. Once the second cycle starts, the response data (e.g., data 1, data 2, data 3, and data 4) can be selected with the first interval time as similar to the first cycle. Such second interval time may be generated and set as by the second interval-time setting unit 2479 for selecting data.

The UDP header generator 2472 may generate a source port number (SPN), a destination port number (DPN), the segment length (len), and checksum (SUM) of UDP header (see FIG. 11) used in the UDP packet (FIG. 3). The destination port number (DPN) and source port number (SPN) may be generated by the identification data generator 2473. For example, same destination port number (DPN) may be generated for the data 1 to data 4. For example, in case of SSDP protocol, "1900" may be a destination number, and in case of SNMP protocol, "162" may be a port number. As such, numbers corresponding to specific protocols may be set. The source port number (SPN) may be specific values for each of the data 1, 2, 3, and 4. For example, the data 1 may have a port number of "5000", data 2 for port number of "4999", data 3 for port number of "4998", and data 4 for port number of "4997." The segment length (len) may be a UDP data length. The checksum (SUM) may be compliment of a header and UDP data having 16 bits.

The IP packet generator 247 may generate IP header (see FIG. 10) of the UDP packet of FIG. 3. For example, an apparatus-designated IP address of the image forming apparatus may be set to the SIP of register 242, and an apparatus-designated hardware address of the image forming apparatus may be set to the SHA of register 242 in advance. Further, if UDP data use SSDP protocol, multicast address may be used. Then, an IP address corresponding to the multicast address may be set to the DIP of register 242, and a hardware address corresponding to the multicast address may be set to the DHA of register 242. Such address can be set using a known method for setting TCP/IP. The TYPE of the register 242 may be set with "0x800" for indicating "IP format."

In the IP header, IP version may be set to "4", header length may be set to "5," and "Type of Service (TOS)" may be set to "0"; a packet length (len) may be a sum of IP header length, UDP header length, and UDP data length; identification (ID) may be set with an "identification" generated by the identification data generator 2473. The "identification" may be also used as an "identification" when generating an ICMP (PING) reply packet. Such "identification" may be generated at every time an IP packet is to be transmitted. Further, "flag" is set with "division is not allowed", "no subsequent fragment," and "fragment offset" is set with "0"; "Time To Live" may be set to "255," which is a maximum value; the "protocol" may be set to 17 for indicating "UDP"; The "header checksum" may be obtained by computing checksum of the IP header and data. The source IP address and the destination IP address are respectively set with the SIP and DIP of the register 242. Further, "Option" may not be generated for the header.

The Ethernet frame header generator 243 receives the IP header and IP data generated by the IP header generator 2471 via the first selector 246. Then, the Ethernet frame header generator 243 generates an Ethernet frame header by adding an Ethernet header to the IP header and IP data. The Ethernet frame header includes a destination MAC Address field, a source MAC Address field, and a "type" field, in which the destination MAC Address field may be set with DHA set in the register 242; the source MAC Address field may be set with SHA set in the register 242; and "type" may be set with TYPE set in the register 242. Because the MAC22 can automatically generate FCS of Ethernet packet, the PE 24A does not need to generate FCS.

As above described, when no-print request (e.g., request of MIB information) is received as a request packet during the low-power mode, the PE 24A can generate (or prepare) and transmit a response packet as a response to such request packet without activating a CPU and a memory in a main control unit, by which power consumption of the CPU and memory in the main control unit can be saved. Further, when SSDP information is transmitted on a periodic basis, the PE 24A can generate and transmit response information without activating a CPU and a memory in a main control unit, by which power consumption of the CPU and memory in the main control unit can be saved. Further, the PE 24A can generate a response packet when the PE 24A receives a no-print request having a data size that is smaller than a given data size during the low-power mode. Further, such response packet may be composed of a plurality of response data having a smaller data size, by which a hardware cost of the PE 24A can be reduced and power consumption can be reduced, which result in a cost reduction of image forming apparatus. Further, the PE 24A may use one or more of information included in an incoming packet as information for generating a response packet, by which a hardware cost of the PE 24A can be reduced and power consumption can be reduced, which result in a cost reduction of image forming apparatus.

Further, during the low-power mode, the PE 24A can generate a response packet using UDP data in response to a no-print request such as UDP request transmitted from the network, and various types of information related to no-print request can be responded by the PE 24A, wherein such no-print request may request MIB information, SSDP information, or the like using SNMP or http protocol using UDP.

In the above-described exemplary embodiments, a computer can be used with a computer-readable program to control functional units used for an information processing apparatus. For example, a particular computer may control the image forming apparatus using a computer-readable program which can execute the above-described processes or steps. Further, in the above-described exemplary embodiments, a storage device (or recording medium), which can store computer-readable program, may be a flexible disk, a CD-ROM (compact disk read only memory), a memory card, a memory chip, or the like, but not limited these. Further, a computer-readable program can be downloaded to a particular computer (e.g., personal computer) via a network, or a computer-readable program can be installed to a particular computer from the above-mentioned storage device, by which the particular computer may be used as the information processing apparatus according to exemplary embodiments, for example.

As above described with reference to exemplary embodiments for the present invention, an information processing apparatus (e.g., a scanner, a printer, a multi-functional imaging apparatus) linked to a network, which can exchange information (e.g., processing-required information, apparatus information) with the network interactively even when the information processing apparatus is set in a low-power mode. Specifically, while maintaining the low-power mode, which stops power supply to a main control unit, a packet transmission using a specific protocol, which may need a change of transaction ID, can be conducted on a periodical basis. Further, while maintaining the low-power mode, various type of request packets transmitted from the network can be responded using response packets, which can be prepared or generated with a relatively simpler manner, and such response packets can be transmitted at a higher transmission speed.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus linked to a network, the information processing apparatus comprising:
    a central processing unit (CPU) disposed in a main control unit;
    a power management unit to control a power-supply mode to the CPU;
    a physical layer to communicate a packet to and from the network;
    a packet engine unit to generate a packet having a given frame structure and to transmit the packet to the network via the physical layer;
    a packet filter to receive a packet from the network via the physical layer, and detect a packet having a given frame structure that is receivable by the packet filter; and
    a transmission control unit to control timing of transmission of the packet generated by the packet engine unit, the packet being transmitted with a given timing,
    wherein the power-supply mode including at least a normal mode, and a low-power mode that stops power supply at least to the CPU and the power management unit supplies power to the physical layer, the packet filter, and the packet engine unit while the information processing apparatus is in the low-power mode,
    wherein the packet engine unit includes
    an identification data generator to generate identification data used for distinguishing each one of packets to-be-transmitted to the network,
    a message data generator to generate message data for each one of packets to be transmitted to the network, and
    a packet frame generator to generate a packet frame prepared by combining the identification data generated by the identification data generator and the message data generated by the message data generator,
    wherein, during the low-power mode,
        the transmission control unit transmits the packet frame generated by the packet engine unit at a preset transmission time interval,
        the packet engine unit generates a first packet automatically, the first packet requesting a response from the network,
        the packet filter detects a second packet, received from the network as a response to the first packet transmitted to the network,
        when a given time elapses after the first packet is transmitted and the packet filter does not receive the second packet from the network, the transmission control unit instructs re-transmission of the first packet for a given number of times, and
        the identification data generator updates the identification data when the first packet is re-transmitted and the second packet is received via the packet filter.

2. The information processing apparatus according to claim 1, wherein the packet engine unit generates the first packet that conforms to dynamic host configuration protocol (DHCP).

3. The information processing apparatus according to claim 1, wherein the packet filter receives and detects the second packet that conforms to DHCP.

4. The information processing apparatus according to claim 2, wherein the identification data generator generates a transaction identification (transaction ID) as identification data used for DHCP.

5. The information processing apparatus according to claim 1, wherein, when the power-supply mode is shifted to the low-power mode from the normal mode, the CPU notifies the identification data generator of identification data used before shifting to the low-power mode.

6. The information processing apparatus according to claim 1, wherein, when the power-supply mode is to be shifted from the low-power mode to the normal mode, the identification data generator notifies the CPU of identification data that is used during the low-power mode.

7. The information processing apparatus according to claim 1, wherein when the packet filter does not receive the second packet, the packet filter instructs the power management unit to shift the power-supply mode from the low-power mode to the normal mode, and notifies the CPU that the packet filter does not receive the second packet.

8. The information processing apparatus according to claim 1, wherein:
the packet filter includes a pattern filter to receive and detect a third packet from the network that requests a response from the information processing apparatus during the low-power mode, and notifies the packet engine unit a detection result of the third packet; and
the packet engine unit generates a fourth packet in response to the third packet, the fourth packet being generated depending on a detection result of the third packet by the packet filter,
the packet engine unit further including:
a reply packet generator to generate the fourth packet in response to the third packet; and
a first selector to receive and select the fourth packet output from the reply packet generator and to transmit the fourth packet to the network.

9. The information processing apparatus according to claim 8, wherein the identification data generator generates a plurality of identification data.

10. The information processing apparatus according to claim 8, wherein the packet engine unit includes a first interval-time setting unit to set a first interval time and a second selector to select and output a plurality of response data with a given order one by one by setting the first interval time for data transmission.

11. The information processing apparatus according to claim 8, wherein the packet engine unit includes a second interval-time setting unit to set a second interval-time, and when the second selector selects and outputs the plurality of response data with the given order one by one with the first interval time set by the first interval-time setting unit, the second interval-time set by the second interval-time setting unit elapses and the second selector resumes to select and output the plurality of response data with the given order one by one with the first interval time again.

12. The information processing apparatus according to claim 8, wherein the packet engine unit generates a packet having a frame structure conformed to Internet protocol (IP), and the identification data generator generates a plurality of identification data as identification used for a packet having a frame structure that conforms to Internet protocol (IP).

13. The information processing apparatus according to claim 12, wherein the plurality of response data includes user datagram protocol (UDP) data that conforms to a UDP frame structure, and the identification data generator generates a port number as identification data used for the UDP frame structure.

14. A method of processing information using an information processing apparatus linked to a network when the information processing apparatus is set to a low-power mode, in which a power supply to a central processing unit being stopped, a first packet having a given frame structure is generated and transmitted from the information processing apparatus to the network, and a second packet having a given frame structure is transmitted from the network to the information processing apparatus, the method, comprising:

generating identification data used for identifying each piece of message data to be transmitted to the network;
preparing the first packet by combining the identification data generated in the identification data generating step and the message data; and
transmitting the first packet generated in the preparing step to the network at a preset transmission time interval in the low-power mode, wherein
the preparing step prepares the first packet automatically at a given time, the first packet requesting a response from the network,
the transmitting step includes a step for re-transmitting the first packet for a given number of times to the network when a given time elapses after the first packet is transmitted and the packet filter does not receive the second packet from the network, and
the identification data generating step updates identification data when the first packet is re-transmitted and the second packet is received via the packet filter.

15. The method according to claim 14, further comprising:
filtering the second packet that is receivable by the information processing apparatus; and
recognizing the second packet, passed by the packet filtering step, as a request packet that is able to be responded to by the information processing apparatus in the low-power mode based on data set in the second packet,
wherein the preparing step further including combining the message data and the identification data generated in the identification generating step based on a recognition result obtained at the recognizing step.

16. A non-transitory computer-readable medium encoded with a program for processing information using an information processing apparatus linked to a network when the information processing apparatus is set to a low-power mode, in which a power-supply to a central processing unit being stopped, a first packet having a given frame structure being generated and transmitted from the information processing apparatus to the network, and then a second packet having a given frame structure being transmitted from the network to the information processing apparatus,
the program comprising instructions that when executed by a computer cause the computer to execute a method of processing information,
the method comprising:
generating identification data used for identifying each piece of message data to be transmitted to the network;
preparing the first packet by combining the identification data generated in the identification data generating step and the message data; and
transmitting the first packet generated in the preparing step to the network at a preset transmission time interval in the low-power mode wherein
the preparing step prepares the first packet automatically at a given time, the first packet requesting a response from the network,
the transmitting step includes a step for re-transmitting the first packet for a given number of times to the network when a given time elapses after the first packet is transmitted and the packet filter does not receive the second packet from the network, and
the identification data generating step updates identification data when the first packet is re-transmitted and the second packet is received via the packet filter.

* * * * *